US011919785B2

(12) United States Patent
Pelman et al.

(10) Patent No.: US 11,919,785 B2
(45) Date of Patent: Mar. 5, 2024

(54) OCEAN ALKALINITY SYSTEM AND METHOD FOR CAPTURING ATMOSPHERIC CARBON DIOXIDE

(71) Applicant: Ebb Carbon, Inc., San Carlos, CA (US)

(72) Inventors: Todd Pelman, Moss Beach, CA (US); Matthew Eisaman, Port Jefferson, NY (US); Ben Tarbell, Palo Alto, CA (US); David Hegeman, San Jose, CA (US); Jeremy Loretz, Palo Alto, CA (US)

(73) Assignee: Ebb Carbon, Inc., San Carlos, CA (US)

( * ) Notice: Subject to any disclaimer, the term of this patent is extended or adjusted under 35 U.S.C. 154(b) by 0 days.

(21) Appl. No.: 18/116,338

(22) Filed: Mar. 2, 2023

(65) Prior Publication Data

US 2023/0212031 A1 Jul. 6, 2023

Related U.S. Application Data

(62) Division of application No. 17/838,967, filed on Jun. 13, 2022, now Pat. No. 11,629,067.
(Continued)

(51) Int. Cl.
*C02F 1/00* (2023.01)
*B01D 53/62* (2006.01)
(Continued)

(52) U.S. Cl.
CPC .............. *C02F 1/008* (2013.01); *B01D 53/62* (2013.01); *B01D 53/78* (2013.01); *B01D 61/002* (2013.01);
(Continued)

(58) Field of Classification Search
None
See application file for complete search history.

(56) References Cited

U.S. PATENT DOCUMENTS 8,778,156 B2 7/2014 Eisaman et al.
8,784,632 B2 7/2014 Eisaman et al.
(Continued)

FOREIGN PATENT DOCUMENTS

EP 2543427 B1 4/2015
WO 2013022334 A1 2/2013

OTHER PUBLICATIONS

YouTube—Intro Talk on Sea Mate on YouTube: https://www.youtube.com/watch?v=950SLzuAuCo Text of talk submitted (15 pages); YouTube video posted approximately Nov. 2021 (8 months ago).
(Continued)

*Primary Examiner* — Richard C Gurtowski
(74) *Attorney, Agent, or Firm* — Bever, Hoffman & Harms, LLP

(57) ABSTRACT

An ocean alkalinity enhancement (OAE) system that reduces atmospheric $CO_2$ and mitigates ocean acidification by electrochemically processing feedstock solution (e.g., seawater or brine) to generate an alkalinity product that is then supplied to the ocean. The OAE system includes a base-generating device and a control circuit disposed within a modular system housing deployed near a salt feedstock. The base-generating device (e.g., a bipolar electrodialysis (BPED) system) generates a base substance that is then used to generate the ocean alkalinity product. The control circuit controls the base-generating device such that the alkalinity product is supplied to the ocean only when (1) sufficient low/zero-carbon electricity is available, (2) it is safe to operate the base-generating device, and (3) supplying the alkalinity product will not endanger sea life. Modified BPED systems include features that facilitate autonomous
(Continued)

system operations including enhanced maintenance cycle operations and a reduced reliance on external fresh water sources.

20 Claims, 11 Drawing Sheets

Related U.S. Application Data

(60) Provisional application No. 63/289,558, filed on Dec. 14, 2021.

(51) Int. Cl.
*B01D 53/78* (2006.01)
*B01D 61/00* (2006.01)
*B01D 61/02* (2006.01)
*B01D 61/44* (2006.01)
*B01D 61/58* (2006.01)
*C02F 1/44* (2023.01)
*C02F 1/469* (2023.01)
*C02F 1/66* (2023.01)
*H01M 8/0656* (2016.01)
*C02F 103/08* (2006.01)

(52) U.S. Cl.
CPC ......... *B01D 61/025* (2013.01); *B01D 61/445* (2013.01); *B01D 61/58* (2013.01); *C02F 1/441* (2013.01); *C02F 1/445* (2013.01); *C02F 1/4695* (2013.01); *C02F 1/66* (2013.01); *H01M 8/0656* (2013.01); *B01D 2251/304* (2013.01); *B01D 2251/604* (2013.01); *B01D 2252/1035* (2013.01); *B01D 2257/504* (2013.01); *B01D 2313/18* (2013.01); *C02F 2103/08* (2013.01); *C02F 2201/005* (2013.01); *C02F 2209/06* (2013.01); *C02F 2209/40* (2013.01)

(56) References Cited

U.S. PATENT DOCUMENTS

| | | |
|---|---|---|
| 9,586,181 B2 | 3/2017 | Eisaman et al. |
| 9,862,643 B2 | 1/2018 | Eisman |
| 9,873,650 B2 | 1/2018 | Eisman et al. |
| 9,914,644 B1 | 3/2018 | Eisman |
| 9,914,683 B2 | 3/2018 | Eisman |
| 9,915,136 B2 | 3/2018 | Eisaman et al. |
| 9,937,471 B1 | 4/2018 | Eismann |
| 2001/0013471 A1* | 8/2001 | Hartel .................... B01D 61/52 204/522 |
| 2013/0336722 A1 | 12/2013 | Wright |
| 2016/0362800 A1 | 12/2016 | Ren |
| 2017/0341952 A1 | 11/2017 | Eisaman |
| 2017/0342328 A1 | 11/2017 | Eisman et al. |
| 2019/0359512 A1 | 11/2019 | Wallace |
| 2020/0024757 A1 | 1/2020 | Mani |
| 2021/0129078 A1 | 5/2021 | Regan et al. |

OTHER PUBLICATIONS

"Panel discussion: The Future of Ocean-Based CDR Research" (https://marinesanctuary.org/chow-2022-archive/#1655833644540-17b07586-5132), invited panelist (remote), Discussion of the NASEM ocean CDR report and ocean CDR policy needs, Capitol Hill Ocean Week, Jun. 8, 2022.

YouTube video "Electrochemical ocean alkalinity enhancement for ocean acidification mitigation and carbon dioxide removal" (https://www.youtube.com/watch?v=NqJJSfn_tOQ), invited talk (remote), University of Calgary, Waves, widgets, and socially desirable technologies, Apr. 8, 2022 (Transcript attached 85 pages).
"Panel discussion: So, What is Ocean Carbon Dioxide Removal Anyway? How Does It Relate to OA?" (https://www.oaalliance.org/webinars/what-is-ocean-carbon-dioxide-removal-anyway), invited panelist (remote), The International Alliance to Combat Ocean Acidification, Mar. 22, 2022, 3 pages.
YouTube video "Decreasing Ocean Acidification via SEA MATE: Safe Elevation of Alkalinity for the Mitigation of Acidification Through Electrochemistry" (https://www.youtube.com/watch?v=950SLzuAuCo), invited talk (remote), This is CDR series sponsored by The Open Air Collective, Sep. 7, 2021 (virtual). (Transcript attached 28 pages).
"Electrochemical Ocean CDR: Current Status and Future Opportunities" (https://www.nationalacademies.org/event/01-27-2021/a-research-strategy-for-ocean-carbon-dioxide-removal-and-sequestration-workshop-series-part-2—Minute 42:12 of Workshop 2), National Academies of Sciences, Engineering, and Medicine Study entitled A Research Strategy for Ocean Carbon Dioxide Removal and Sequestration, Workshop 2 Technological Approaches (remote), Jan. 27, 2021, 3 pages.
YouTube video "What is Needed to Deploy and Scale Direct Ocean Capture?" (https://www.youtube.com/watch?v=PviW54JjCYQ), Invited Lightning Talk (remote), Smart Oceans 2020, Convergence Session IV: From Protection to Sustainable Utilization (co-presented with Dr. Brendan Carter, UW), Oct. 5, 2020 (Transcript attached 5 pages).
"Ocean Visions' Experts to Advise/Evaluate Innovation Tackling Ocean Acidification", Atlanta, Georgia, Apr. 28, 2021, 3 pages.
YouTube video "Ocean carbon dioxide removal (CDR) via elecrochemistry—A ClimaeWorks production", Link: https://www.youtube.com/watch?v=MtJ_24aJ210—5 minute explainer video of electrochemical ocean carbon dioxide removal generally that Matt Eisaman (Sea Mate project lead) helped make; Jul. 2021 (approx) (Transcript attached 6 pages).
YouTube video https://www.youtube.com/watch?v=ecb_uAgBUU0—CDR EP04: Ocean CDR Pathways with Catherine Jadot PhD and David Koweek Ph, presented by OpenAir; talk given my Matt Eisaman, Sep. 2021 (appoximately) (Transcript attached 28 pages).
Eisaman, Matthew D., article entitled "Negative Emissions Technologies: The Tradeoffs of Air-Capture Economics", CellPress, Joule 4, 516-520, Mar. 18, 2020, 5 pages.
Eisaman, Matthew D., et al., "Indirect ocean capture of atmospheric CO2 Part II, Understanding the cost of negative emissions", Int. J. Greenh. Gas Control, 70, 254-261 (8 pages) 2018; plus Supplemental Information (16 pages).
De Lannoy, Charles-Francois et cl., "Indirect ocean capture of atmospheric CO2 Part I, Prototype of a negative emissions technology", Int J. Greenh. Gas Control, 70, 243-253 (11 pages) 2018); plus Supplemental Information (21 pages).
Eisaman, Matthew D., et al., "CO2 extraction from seawater using bipolar membrane electrodialysis", Energy & Environmental Science, 5, 7346-7352 (2012).
Pearson, R.J., et al., "Invited Paper: Energy Storage Via Carbon-Neutral Fuels Made From CO2 Water, and Renewable Energy", Proceedings of the IEEE, 100, 440-460 (21 pages), 2012.
Eisaman, M.D., et al., "CO2 desorption using high-pressure bipolar membrane electrodialysis", Energy & Environmental Science, 4, 4031-4037 (2011).
Eisaman, M.D., et al., "CO2 separation using bipolar membrane electrodialysis", Energy & Environmental Science, 4, 1319-1328 (2011).

\* cited by examiner

OCEAN ALKALINITY SYSTEM AND METHOD FOR CAPTURING ATMOSPHERIC CARBON DIOXIDE

RELATED APPLICATIONS/PATENTS

This application is a divisional of U.S. patent application Ser. No. 17/838,967, entitled "OCEAN ALKALINITY SYSTEM AND METHOD FOR CAPTURING ATMOSPHERIC CARBON DIOXIDE" filed on Jun. 13, 2022, now issued as U.S. Pat. No. 11,629,067, which claims priority from U.S. Provisional Patent Application No. 63/289,558, entitled "CONTROL OF A SYSTEM FOR CAPTURING ATMOSPHERIC CARBON DIOXIDE BY INCREASING OCEAN ALKALINITY, AND BIPOLAR ELECTRODIALYSIS SYSTEM FOR CAPTURING ATMOSPHERIC CARBON DIOXIDE", filed on Dec. 14, 2021, which is entirely incorporated herein by reference.

FIELD OF THE INVENTION

The systems, methods, and devices described herein relate to reducing atmospheric carbon dioxide ($CO_2$) and mitigating ocean acidification.

BACKGROUND OF THE INVENTION

As humans burn more and more fossil fuels, the resulting increased carbon dioxide ($CO_2$) concentration in Earth's atmosphere causes both climate change and ocean acidification. The increased atmospheric concentrations of $CO_2$ and other greenhouse gasses (e.g., methane) produces climate change by trapping heat close to earth's surface, thereby increasing both air and sea temperatures. Because earth's oceans absorb about 25% of atmospheric $CO_2$, and because the absorbed $CO_2$ dissolves to form carbonic acid that remains trapped in the seawater, the increased atmospheric $CO_2$ concentration caused by burning fossil fuels also produces ocean acidification by way of increasing the amount of $CO_2$ gas dissolved in the ocean.

Both climate change and ocean acidification pose significant threats to humans. Climate change in the form of increased global average temperatures can produce several dangerous effects such as the loss of polar ice and corresponding increased sea levels, disease, wildfires and stronger storms and hurricanes. Ocean acidification changes the ocean chemistry that most marine organisms rely on. One concern with ocean acidification is that the decreased seawater pH can lead to the decreased survival of shellfish and other aquatic life having calcium carbonate shells, as well as some other physiological challenges for marine organisms.

To avoid dangerous climate change, the international Paris Agreement aims to limit the increase in global average temperature to no more than 1.5° C. to 2° C. above the temperatures of the pre-industrial era. Global average temperatures have already increased by between 0.8° C. and 1.2° C. The Intergovernmental Panel on Climate Change (IPCC) estimates that a 'carbon budget' of about 500 $GtCO_2$ (billion tons of carbon dioxide), which corresponds to about ten years at current emission rates, provides a 66% chance of limiting climate change to 1.5° C.

In addition to cutting $CO_2$ emissions by curtailing the use of fossil fuels, climate models predict that a significant deployment of negative emissions technologies (NETs) will be needed to avoid catastrophic ocean acidification and global warming beyond 1.5° C. (see "Biophysical and economic limits to negative CO2 emissions", Smith P. et al., Nat. Clim. Chang. 2016; 6: 42-50). Current atmospheric $CO_2$ and other greenhouse gas concentrations are already at dangerous levels, so even a drastic reduction in greenhouse gas emissions would merely curtail further increases, not reduce atmospheric greenhouse gas concentrations to safe levels. Moreover, the reduction or elimination of greenhouse gas sources (e.g., emissions from long distance airliners) would be extremely disruptive and/or expensive and are therefore unlikely to occur soon.

Therefore, there is a need to supplement emission reductions with the deployment of NETs, which are systems/processes that serve to reduce existing atmospheric greenhouse gas concentrations by, for example, capturing/removing $CO_2$ from the air and sequestering it for at least 1,000 years. The need for NETs may be explained using a bathtub analogy in which atmospheric $CO_2$ is represented by water contained in a bathtub, ongoing $CO_2$ emissions are represented by water flowing into the tub, and NETs are represented by processes that control water outflow through the tub's drain. In this analogy, reduced $CO_2$ emission rates are represented by partially turning off the water inflow tap—the slower inflow rate provides more time before the tub fills, but the tub's water level will continue to rise and eventually overflow. Using this analogy, although reducing $CO_2$ emissions may slow the increase of greenhouse gas in the atmosphere, critical concentration levels will eventually be reached unless NETs are implemented that can offset the reduced $CO_2$ emission level (i.e., remove atmospheric $CO_2$ at the same rate it is being emitted). Moreover, because greenhouse gas concentrations are already at dangerous levels (i.e., the tub is already dangerously full), there is an urgent need for NETs that are capable of significantly reducing atmospheric $CO_2$ faster than it is being emitted to achieve safe atmospheric concentration levels (i.e., outflow from the tub's drain must be greater than the reduced inflow from the tap to reduce the tub's water to a safe level).

NETs include Direct Air Capture (DAC) approaches and Indirect Ocean Capture (IOC) approaches. DAC NET approaches, which attempt to extract $CO_2$ directly from the atmosphere, can be broadly divided into two categories: Nature-based DAC approaches and Technological (technology-based) DAC approaches. Nature-based DACs include Forestry and Soil Carbon Sequestration (SCS) approaches. Forestry approaches (aka, Afforestation and Reforestation) promote the expansion and development of forested land to increase the capture and storage of atmospheric $CO_2$. SCS DAC approaches utilize several natural approaches (including forestry) to improve soil fertility and increase soil carbon saturation limits. Technological DACs include Bioenergy with Carbon Capture and Storage (BECCS), which involves the utilization of biomass as an energy source and the capture and permanent storage of $CO_2$ produced during the conversion of biomass to energy. IOC NET approaches attempt to offset greenhouse gas emissions by increasing the ocean's ability to absorb atmospheric $CO_2$ using various natural and/or technological processes such as Mineral Ocean Alkalinity Enhancement. Mineral Ocean Alkalinity Enhancement involves adding solid alkaline substances (e.g., crushed minerals such as olivine or lime) to seawater to enhance the ocean's natural carbon sink function.

The above-mentioned NET approaches are problematic in that they can be not economically self-sustaining and/or pose measurability, permanence, additionality, toxicity, safety, and/or scalability problems. For example, in the case of existing Mineral Ocean Alkalinity Enhancement approaches, measurability and verification are complicated by uncertainties around the dissolution kinetics of the solid alkaline substances, while impurities and trace metals in the solid alkaline substances lead to concerns about toxicity and safety for marine ecosystems.

What is needed is an economically sustainable NET approach that measurably and permanently reduces atmospheric $CO_2$ and mitigates ocean acidification and has the ability to scale to a meaningful amount of $CO_2$ removal (i.e., on the order of gigaton of removed $CO_2$ per year).

SUMMARY OF THE INVENTION

The embodiments described herein are directed to an electrochemical ocean alkalinity enhancement (OAE) system and associated operating method that reduces atmospheric carbon dioxide ($CO_2$) and mitigates ocean acidification by generating a base solution containing a fully dissolved base (caustic) substance and supplying the ocean alkalinity product to ocean seawater at a designated outfall location, whereby the base substance diffuses (disperses) into the surrounding seawater. Accordingly, aspects described herein directly reverse ocean acidification (i.e., by utilizing the base substance in the ocean alkalinity product to increases the ocean seawater's alkalinity), and indirectly reduces atmospheric $CO_2$ (i.e., increasing the ocean seawater's alkalinity increases the ocean's ability to absorb/capture atmospheric $CO_2$). Moreover, because the generated base substance is fully dissolved in the ocean alkalinity product, the aspects described herein avoid the dissolution kinetics issues (mentioned above) that are associated with conventional Mineral Ocean Alkalinity Enhancement approaches.

According to an aspect described herein, the OAE system includes a base-generating device that electrochemically processes an externally supplied feedstock (saline) solution to generate a base solution comprising fully dissolved NaOH molecules. In some embodiments the ocean alkalinity product is then produced by mixing the base solution with saltwater to achieve a pH that is a predetermined amount higher than the ocean's seawater (e.g., in a target pH range between 8.0 and 9.0). In another embodiment the base solution is not mixed with seawater, but controllably added to the ocean directly in a safe manner. The feedstock solution can be supplied to the OAE system from an external salt feedstock. In some embodiments the feedstock solution may comprise seawater pumped directly from a large saltwater body (i.e., a sea, ocean or saltwater lake, which for brevity are collectively referred to herein as "ocean" and the associated saltwater is referred to as "seawater"). However, in some embodiments, the feedstock solution comprises brine from a desalination plant, water recycling plant or another brine source that is deployed near an ocean. In one embodiment, the electrochemical process performed by the base-generating device involves dissociating water and salt molecules in the feedstock solution such that the resulting hydroxide and sodium ions combine to generate NaOH molecules in the base solution. The base solution is then tested and processed (e.g., reacted with air or $CO_2$ and/or diluted with processed feedstock solution, seawater or another saltwater solution) to generate the ocean alkalinity product having the target pH range. After verifying that the ocean alkalinity product is within the target pH range, the base-generating device may supply the ocean alkalinity product to the ocean (e.g., by pumping the ocean alkalinity product through a transfer pipe to a designated outfall location).

According to another aspect described herein, the OAE system includes a control circuit is operably configured to monitor input data received from multiple sources (e.g., sensors) and to control operations performed by the base-generating device such that the ocean alkalinity product is supplied to the ocean only when the monitored input data indicates (1) sufficient low/zero-carbon electricity is available to operably power the base substance generation and supply operations performed by the base-generating device, (2) the base-generating device is operably configured to perform the generation and supply operations safely, and (3) supplying the ocean alkalinity product will not endanger, and is most likely to benefit, sea life in the ocean (e.g., adjacent to the outfall location). In some embodiments the control circuit is a computer/processor that implements software-based instructions or is otherwise configured to execute a control algorithm that continuously monitors the input data, and controls operations performed by the base-generating device. To maximize net carbon reduction and to minimize environmental threats, the control circuit can also be configured to restrict base substance supplying operations performed by the base-generating device to (fourth) time periods when all three conditions (1), (2) and (3) are concurrently satisfied. In some embodiments, to maximize operating efficiency, the control circuit may be further configured to perform automated maintenance cycles during (fifth) time periods during which conditions (1) and (2) are satisfied (i.e., low/zero-carbon electricity is available and the base-generating device is capable of safely conducting the automated maintenance cycles, but when supplying the base substance may endanger sea life). In other embodiments, certain low-power-consumption maintenance cycles (e.g., descaling operations, described below) may be implemented when low/zero-carbon electricity is unavailable, particularly when performing these maintenance cycles enhances operating efficiency (e.g., enhancing the lifetime of ion exchange membranes by reducing degradation) during subsequent high-power-consumption operating cycles. By controlling operations of the base-generating device in this fully automated manner, the OAE systems and methods described herein may address the additionality issue associated with conventional approaches by restricting high-power-consuming operations (e.g., base generation) to time periods when sufficient low/zero carbon electricity is available. The aspects described herein may also minimizes environmental impact by restricting base-generating operations to time periods when the base-generating device can be operated safely, and by supplying the base substance to an outfall location in a molecular form that reliably and predictably disperses into the surrounding ocean seawater. The aspects described herein may also fill the need for economically sustainable NETs (carbon offset systems) by reducing costs for operation and maintenance (i.e., reducing or eliminating the need for human operators and maintenance providers). Moreover, the aspects described herein may meet the need for measurability and verification by way of utilizing ocean-based sensors to verify the predictable dispersion of the base substance molecules into the seawater surrounding the outfall location. Finally, the permanence of the $CO_2$ capture approach utilized by the aspects described herein has been shown to be quite long (approximately 10,000 years).

In some embodiments the base-generating device implemented in each OAE system includes a bipolar electrodialysis (BPED) system that processes the externally supplied feedstock solution (e.g., seawater or brine) in a way that generates both the concentrated base solution (base substance) and a concentrated acid solution. In an embodiment, the BPED system includes a fluid buffering system, an electrodialysis apparatus, a flow control system and a series of flow lines (i.e., tubes, pipes or other suitable fluid conduit structures). The fluid buffering system may include three main buffer tanks respectively configured to store the feedstock solution, the base solution and the acid solution. The electrodialysis apparatus may include a contained ion exchange stack including a series of salt, acid and base chambers that are respectively separated by ion-permeable membranes (filters). Each salt chamber may be separated from an adjacent acid chamber by an intervening first filter type and separated from an adjacent base chamber by an intervening second filter type. The electrodialysis apparatus may also include electrodes that are configured to apply an electric field across (through) the salt, acid and base chambers that causes ions to pass through the intervening filters in a predetermined manner. During operation the flow control system may utilize one or more pumps to direct a salt stream from the salt buffering tank through the salt chambers of the electrodialysis apparatus by way of a salt input line and a salt output line. Similarly, the flow control system may utilize additional pumps and associated inflow/outflow lines to direct an acid stream from the acid buffering tank through the acid chambers and a base stream from the base buffering tank through the base chamber. The electrodialysis apparatus can be configured such that the applied electric field causes Cl− ions to pass from the salt chambers through the first filters into the acid chambers, and also causes Na+ ions to pass from the salt chambers through the second filters into the base chambers in a way that concentrates (increases) the amount (strength) of acid (HCl) in the acid stream and the amount of base (NaOH) in the base stream. That is, the "outflow" acid and base streams leaving the electrodialysis apparatus can be stronger (i.e., have a higher concentration of acid and base substance, respectively) than the "inflow" acid and base streams supplied to the electrodialysis apparatus. Therefore, the properties of concentration and pH may change as each acid/base fluid stream passes through the electrodialysis apparatus. Accordingly, an advantage of utilizing a BPED system in the OAE system described above is the beneficial generation of an acid substance that can be utilized for a variety of commercial purposes. For example, in some embodiments the BPED system may be operated in "feed and bleed" mode wherein some of the stronger acid stream exiting the electrodialysis apparatus is bled off as an acid product that may be commercially utilized (e.g., processed by an electrolyzer to generate hydrogen gas, chlorine gas and/or oxygen gas) to further enhance the economically sustainability of the OAE system as a carbon offset system (e.g., by utilizing the hydrogen gas to generate supplemental electricity that can be used by the OEA system).

In some embodiments the BPED system utilizes a modified flow control system that facilitates automatic descaling of the base and salt chambers of an electrodialysis apparatus during maintenance cycles. In an embodiment the modified flow control system includes a set of three-way valves and associated cross-feed lines that are operably configured to facilitate automatic descaling operations during periodic maintenance operation cycles. During normal base generation/supply operations (i.e., while the BPED system is controlled to generate and supply base substance to the ocean), the three-way valves are controlled using first control signals to direct salt, acid and base streams respectively from the salt, acid and base buffer tanks through the salt, acid and base chambers of the electrodialysis apparatus, respectively, and then back to the respective buffer tanks. In contrast, during selected maintenance cycle operations, the three-way valves can be controlled using second control signals such that an acid stream leaving the acid buffer tank is diverted (i.e., by way of corresponding cross-feed lines) through the salt chamber and/or the base chamber and then returns to the acid buffer tank. As it passes through the salt and base chambers, the diverted acid stream may serve to dissolve and remove scaling that gradually builds up on the corresponding surfaces of the intervening bipolar filters and impedes the efficient transfer of ions between adjacent chambers. By utilizing a BPED system having a flow control system that is modified in this manner, the systems and methods described herein may further enhance the economic sustainability of the OAE system by facilitating automatic maintenance operations that enhance the operating efficiency of the BPED system (i.e., by way of performing periodic descaling of the electrodialysis apparatus without the need for human involvement).

In some embodiments the BPED system is further modified to include a pretreatment unit that is configured to reduce or eliminate the OAE system's dependence on a fresh water supply by at least partially desalinating (i.e., removing at least some of the salt and other divalent cations from) an externally supplied feedstock solution (i.e., seawater or brine), and then utilizing the resulting reduced-salt fluid to generate the acid solution and/or the base solution (e.g., by supplying the reduced-salt fluid to the acid (second) and/or base (third) buffer tanks instead of fresh water from an external source). In some embodiments, a reverse osmosis (pretreatment) unit processes the externally supplied feedstock solution (e.g., seawater) to generate a permeate (reduced-salt fluid) and a concentrate (i.e., a high-salt fluid having a higher salt concentration than the feedstock solution and a significantly higher salt concentration than the permeate). In these embodiments, the concentrate (high-salt fluid) is used as the feedstock solution supplied to the salt (first) buffer tank and the permeate is directed to both the acid (second) and base (third) buffer tanks (i.e., to replace liquid volume reductions caused by the above-mentioned feed-and-bleed operations, and to maintain optimal solution concentrations). In other embodiments, brine is used as the externally supplied feedstock solution, and a chemical acid concentrator (pretreatment) unit is configured to utilize the brine to concentrate a portion of the strong acid stream leaving the electrodialysis apparatus, and a reduced-salt fluid produced by the acid concentration process is utilized as the feedstock solution provided to the salt (first) buffer tank. In cases where the salt content of the reduced-salt fluid is acceptably low, a portion of the reduced-salt fluid may also be directed to both the acid (second) buffer tank and the base (third) buffer tank (i.e., to replace liquid volume reductions instead of fresh water). In other cases (e.g., those requiring relatively pure concentrated acid solution), a portion of the reduced-salt fluid may be supplied to the base (third) buffer tank, and fresh or deionized water may be supplied to the acid (second) buffer tank. Utilizing a BPED system that is modified to include one of the pretreatment arrangements mentioned above may further reduce the operating costs of OEA systems formed in accordance with the aspects described herein by significantly reducing or eliminating the need for a fresh water supply, which can represent a significant operating expense in remote settings.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The methods and systems described herein relate to an improvement in methods and systems for reducing atmospheric carbon and mitigating ocean acidification. The following description is presented to enable one of ordinary skill in the art to make and use the methods and systems described herein as provided in the context of specific embodiments. Various modifications to the embodiments will be apparent to those with skill in the art, and the general principles defined herein may be applied to other embodiments. Therefore, the methods and systems described herein are not intended to be limited to the particular embodiments shown and described but are to be accorded the widest scope consistent with the principles and novel features herein disclosed.

Figure 1:
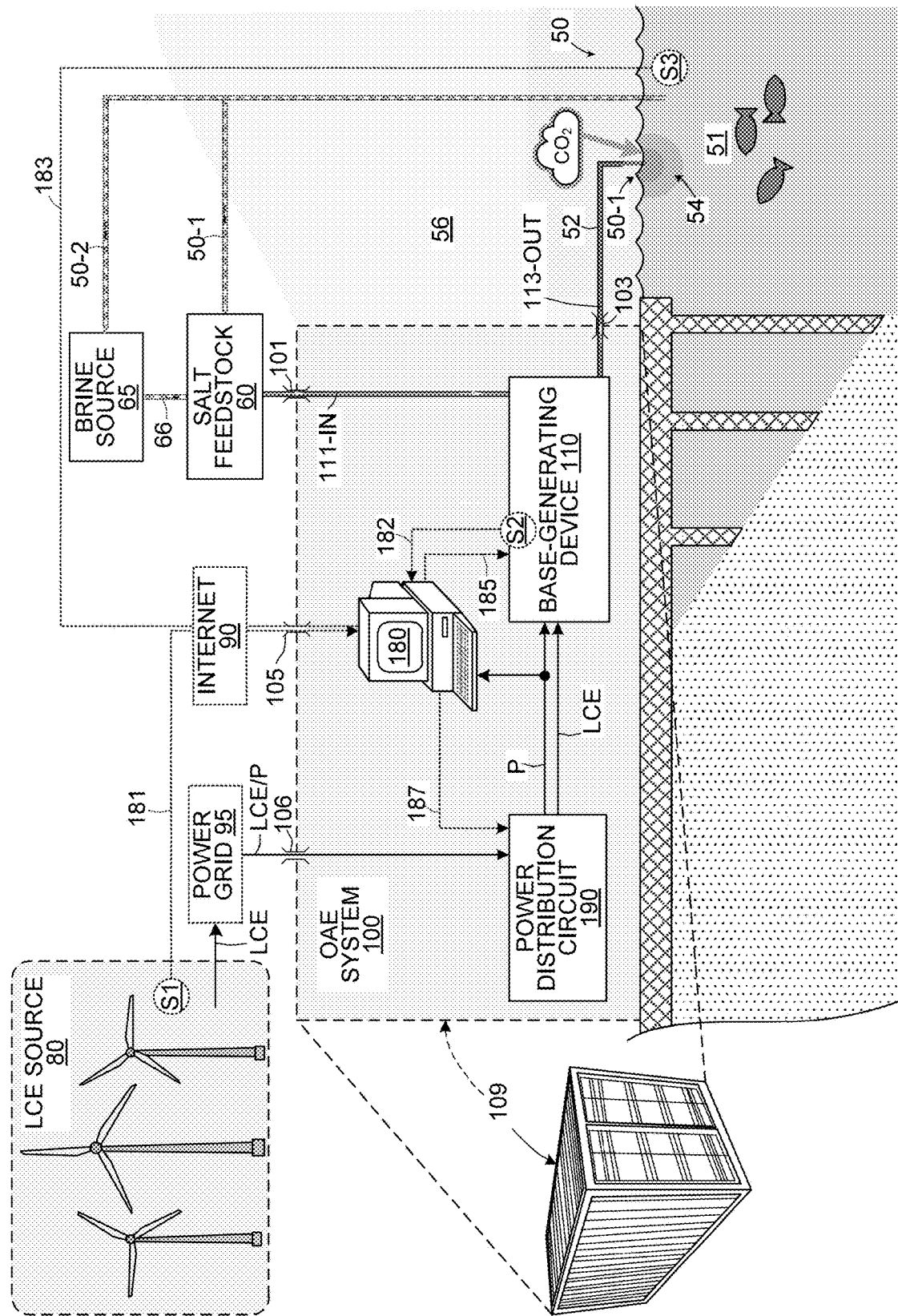
FIG. 1 is a diagram depicting an electrochemical ocean alkalinity enhancement (OAE) system according to an embodiment.

FIG. 1 shows a generalized OAE system 100 that is configured to capture carbon dioxide ($CO_2$) from earth's atmosphere and mitigate ocean acidification by generating and supplying an ocean alkalinity product 113-OUT (i.e., an aqueous solution comprising salt and a base (caustic) substance and having a pH>8) to seawater 51 at an outfall location 50-1. As indicated in the lower right portion of FIG. 1, the base substance supplied with alkalinity product 113-OUT may gradually diffuse (disperses) into seawater 51 surrounding outfall location 50-1 (e.g., as depicted by region 54 in FIG. 1), and the resulting increased alkalinity of seawater 51 may reduce ocean acidification and increases the ocean's ability to absorb/capture atmospheric $CO_2$ (e.g., from atmospheric region 56 located over seawater 51). As described below, OAE system 100 carefully controls the generation and supply of ocean alkalinity product 113-OUT to prevent harm to sea life caused by dangerously high seawater pH levels near outfall location 50-1, which may occur if the base substance in ocean alkalinity product 113-OUT is supplied in an uncontrolled (e.g., continuous or highly concentrated) manner into seawater 51. While outfall location 50-1 is depicted as a single location, in practice, alkalinity product 113-OUT may be supplied to ocean 50 at multiple locations in space and time.

In some embodiments, OAE system 100 receives and processes an externally supplied feedstock (salt) solution 111-IN to generate alkalinity product 113-OUT, and transports (supplies) alkalinity product 113-OUT to outfall location 50-1 by way of being pumped through a transport pipe 52. In some embodiments externally supplied feedstock solution 111-IN is supplied to OAE system 100 from an external salt feedstock source 60. In some embodiments, feedstock solution 111-IN includes seawater (ocean water) 50-1 that is pumped directly from ocean 50. In other embodiments, feedstock solution 111-IN comprises brine 66 generated by a brine source 65 (e.g., a desalination plant or a water recycling plant that processes seawater 51-2 and generates brine 66 as a byproduct).

Referring to the lower portion of FIG. 1, OAE system 100 may include a base-generating device 110, a control circuit 180 and a power distribution circuit 190.

Base-generating device 110 may comprise a device/system that is configured to (i.e., when supplied with sufficient operating power) both generate alkalinity product 113-OUT by processing feedstock solution 111-IN and to supply (e.g., pump) alkalinity product 113-OUT to outfall location 50-1 (e.g., by way of transfer pipe 52). In some embodiments device 110 is implemented using any of the features described below with reference to FIGS. 3 to 9. In other embodiments, device 110 may be another device or system capable of generating and supplying alkalinity product 113-OUT to outfall location 50-1.

Control circuit 180 can be an electronic device (e.g., a computer/processor or dedicated electronic device) that implements software-based instructions or is otherwise configured to execute a control algorithm that controls base-generating device 110 and an optional power distribution circuit 190 in a fully autonomously manner (e.g., as described below with reference to FIG. 2). In one embodiment, control circuit 180 controls operations performed by base-generating device 110 such that alkalinity product 113-OUT is generated/supplied only during time periods when the control algorithm determines that three predefined conditions are satisfied: (1) sufficient low/zero-carbon electricity (LCE) is available to operably power base-generating device 110, (2) base-generating device 110 is operably configured to safely generate and supply alkalinity product 113-OUT to outfall location 50-1, and (3) supplying alkalinity product 113-OUT will not endanger, and is most likely to benefit, sea life in seawater 51 (e.g., adjacent to the outfall location 50-1). To facilitate determining that these conditions are satisfied, control circuit 180 can be configured to receive and process various input data signals received from sensors and/or other data sources. In an embodiment, these various input data signals may include an LCE availability data signal 181, a base-generating device operational safety data signal 182, and an ocean chemistry data signal 183 that may be supplied by way of direct connection or by a local or wide area network (e.g., by way of the World Wide Web (Internet) 90) to control circuit 180. The sources and content of data signals 181, 182 and 183 are described in the following paragraphs.

LCE availability data signal 181 can indicate whether sufficient low/zero-carbon electricity LCE is available to facilitate the generation and supply of alkalinity product 113-OUT by base-generating unit 110. To maximize atmospheric carbon dioxide reduction by adding alkalinity to seawater 51, low or zero carbon intensity electricity LCE (herein referred to as "low/zero-carbon electricity") generated by one or more LCE sources 80 can be utilized by base-generating unit 110 to generate/supply alkalinity product 113-OUT. In some embodiments, LCE data signal 181 is generated using known techniques such that it provides some measure of the composition of power supplied by each power generation source coupled to OAE system 100 (e.g., by way of a power grid 95). That is, electrical power supplied to OAE system 100 from power grid may include both LCE produced by one or more LCE sources 80 (e.g., wind, solar, tidal, hydro, clean hydrogen, nuclear, geothermal, or BECCS) and other electrical power P which may be distinguished from carbon dioxide emitting power generation sources such as coal or gas driven turbines. LCE availability data signal 181 can indicate whether the total power LCE/P supplied to OAE system 100 includes sufficient low/zero-carbon electricity LCE to power base-generating device 110. LCE availability data signal 181 may be generated using one or more sensors S1, or may be obtained from such sources such as data from federal power agencies, state power agencies, balancing authorities, third party energy aggregators, power purchase agreements, power producers, local utilities, state utilities commissions, or other available data streams or may be derived from other available data that can indicate supply or demand of electricity at a given time or place in an energy grid including weather or production data streams. In some embodiments LCE availability data signal 181 may also include spot pricing information that may be used to control the operations of OAE system 100 in a way that maximizes efficiency and minimizes operating costs. Energy pricing information may be accessible in real-time or in a futures market on a locational, marginal level through local energy markets platforms, authorities or commercial market participants. Transmission of LCE availability data signal 181 may be by wired connection (e.g., directly from sensor S1 or dedicated LCE source 80 or by way of Internet 90) or by wireless transmission. In some embodiments, the future LCE data signal (for example the signal in the next hour or next 24 hours) may be estimated using predictive modeling and this information will be used to optimize planned system uptime.

Operational safety signal 182 generally indicates whether base-generating device 110 is operably configured to safely generate base substance 113, or, for example, damage to OAE system 100 may result from the generation and supply of alkalinity product 113-OUT by base-generating device 110. In one embodiment, operational safety signal 182 may be generated by one or more sensors S2 that monitor associated parameters (e.g., pressure, temperature) associated with the operation of base-generating device 110, and allow the control algorithm to operate device 110 within certain safety and environmental health constraints or requirements, or to cause device 110 to enter a safe operating state (e.g., turning off power or shutting valves and/or alerting local authorities) in response to various safety anomalies (e.g., leaks, fire, overcurrent, thermal or seismic) indicated by operational safety signal 182. System functions and components that may be controlled include power, voltage, current, pump speeds, control valves, maintenance cycles, tank levels, as well as system duty cycle (on or off), or selecting which individual membranes, modules, or stacks to utilize at a given time. In alternative embodiments controlling these system functions and components may be operated remotely by an operator or may be fully autonomous (i.e., without the need for continuous human supervision) to enable lights-out operation.

Seawater chemistry data signal 183 generally indicates whether generating and supplying alkalinity product 113-OUT to outfall location 50-1 may endanger, or benefit, sea life. In some embodiments, at least part of seawater chemistry data signal 183 is generated by one or more sensors S3 located in or near seawater 51 adjacent to outfall location 50-1, and includes measured seawater chemistry data such as, but not limited to, pH, total dissolved inorganic carbon (DIC), total alkalinity, partial pressure of $CO_2$ ($pCO_2$), conductivity, salinity, temperature, pressure, refractometry, flow rates, density, or any other properties thereof. In some embodiments seawater chemistry data signal 183 also includes data generated using ocean and other environmental models configured to predict ocean currents, weather, tides, biological productivity, location and type of marine organisms, and demand for electricity. In some embodiments, the performance of OAE system 100 may be monitored by measuring seawater 51 near outfall location 50-1 to achieve an effective mixture of alkalinity product 113-OUT in seawater 51. Transmission of seawater chemistry data signal 183 may be by wired connection (e.g., by a wire directly connecting sensor(s) S3 to control circuit 180 or by way of Internet 90) or by wireless transmission.

The control algorithm executed by control circuit 180 can receive and process data signals 181, 182 and 183 (e.g., in the manner depicted in the flow diagram of FIG. 2, discussed below) to continuously control base generating device 110 and to optimize overall system parameters to, for example, minimize cost, or maximize throughput, or maximize uptime, or minimize impact on sea life, or minimize flow rates, or predict when to run and when to remain idle, or when to perform planned maintenance, or periodic membrane cleaning cycles. In some embodiments, the control algorithm implemented by control circuit 180 utilizes machine learning and artificial intelligence.

Optional power distribution circuit 190 can be configured to distribute externally supplied electrical power LCE/P to base-generating device 110 in response to control signal 187 generated by control circuit 180. That is, when the control algorithm determines that the three conditions mentioned above are satisfied, control circuit 180 can assert control signal 187. In one embodiment, when low/zero-carbon power LCE is not available, power P can be supplied by power distribution circuit 190 to control circuit 180 to facilitate continuous processing of the control algorithm described herein. In some embodiments, power P is also supplied by power distribution circuit 190 to base generating unit 110 to facilitate certain low-power-consumption maintenance operations (e.g., the descaling operation described below with reference to FIGS. 5, 6A and 6B).

As indicated at the bottom of FIG. 1, the various components of OAE system 100 may be disposed within a modular system housing 109 to facilitate transport and placement near a salt feedstock 60 and seawater 51, and to protect OAE system 100 during operation. In some embodiments, housing 109 is an otherwise standard shipping container that is modified to include various access ports configured to facilitate operable connections of the various system components to external sources/destinations. In the depicted example, a salt input port 101 is provided to facilitate the transfer of feedstock solution 111-IN into housing 109 for receipt by base-generating device 110, a base output port 103 is provided to facilitate the transfer of alkalinity product 113-OUT supplied by base-generating device 110 to transfer pipe 52, a data port 105 is provided to transfer externally generated signals 181 and 183 to control circuit 180, and a power port 106 is provided to transfer low/zero-carbon electricity LCE and other power P to power distribution circuit 190. In other embodiments housing 109 may be omitted; for example, OAE system 100 may be integrated into a brine-producing industrial process facility (e.g., deployed within a building or other structure containing a desalination plant), thereby obviating the need for a separate protective housing.

Figure 2:
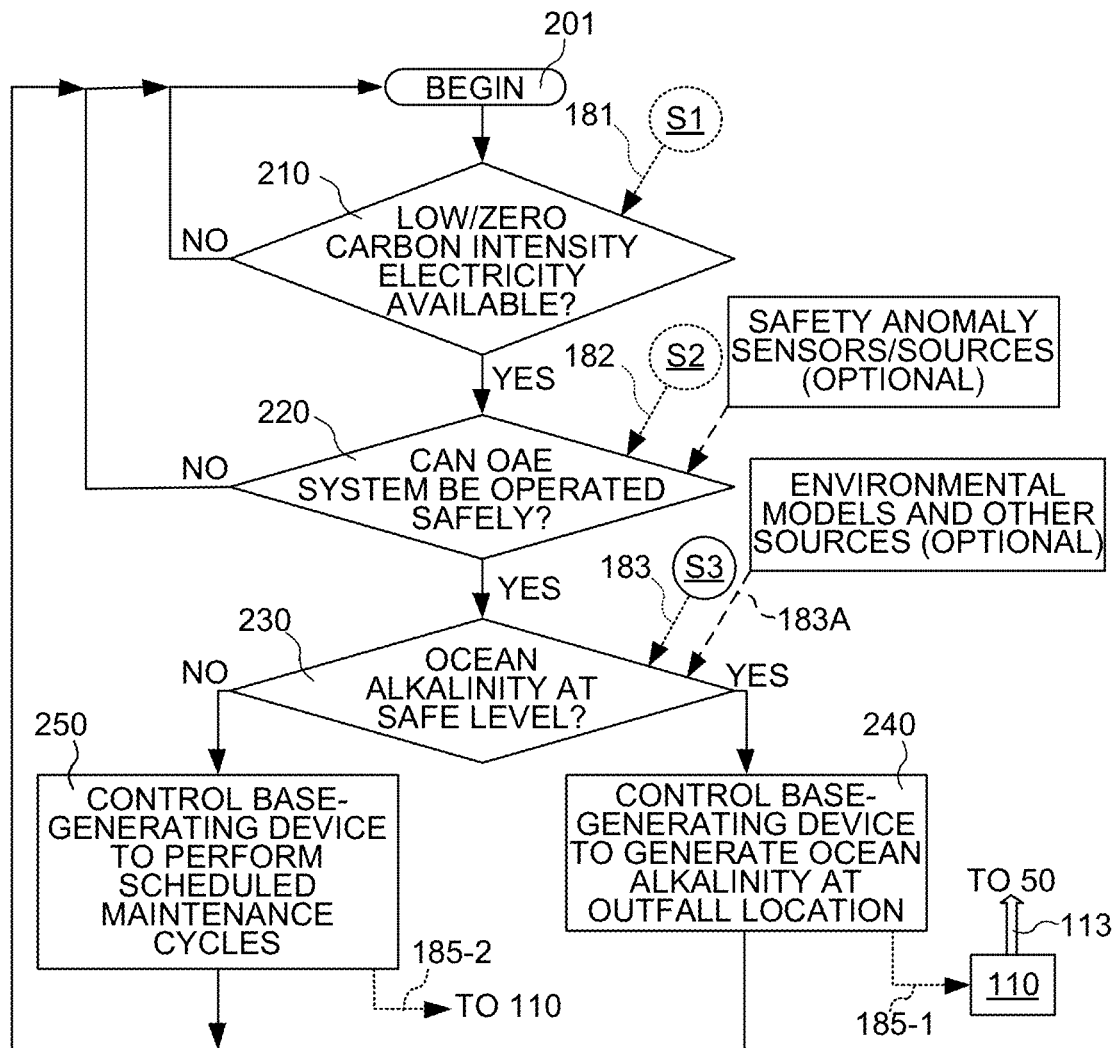
FIG. 2 is a flow diagram depicting a control method utilized to control the OAE system of FIG. 1 according to another embodiment.

FIG. 2 depicts a generalized method for controlling operations performed by OAE system 100 (FIG. 1) such that it captures atmospheric carbon dioxide and mitigates seawater acidification. In one embodiment, the method is performed using computer-based instructions that form a control algorithm executed by the processor of control circuit 180 (FIG. 1). That is, control circuit 180 can be operably configured and utilized to monitor various signals (e.g., sensor/data signals 181, 182 and 183), and to restrict operations of base-generating device 110 (FIG. 1) to time periods when specific operating conditions are present.

Referring to start block 201 (top of FIG. 2), the method may begin by (decision block 210) monitoring the availability of low/zero-carbon electricity (e.g., by monitoring data signal 181 received from sensor(s) S1, described above, and/or other control signal sources). When insufficient low/zero-carbon electricity is available (NO branch from block 210), control can be returned to block 201, thereby effectively preventing operations performed by base-generating device 110 when insufficient low/zero-carbon electricity is available. When sufficient low/zero-carbon electricity is available (YES branch from block 210), control can be passed to decision block 220. For clarity, each portion of time during which sufficient low/zero-carbon electricity is available is referred to as a first time period. As established by block 210, the control algorithm may restrict the flow of operating power to base-generating device 110 such that base-generating device 110 receives sufficient operating power (e.g., to generate base substance) only during first time periods (i.e., when sufficient low/zero-carbon electricity at sufficiently low cost is available from one or more low/zero-carbon electricity sources 80).

Referring to decision block 220, the control algorithm may next determine whether base-generating device 110 can be operated safely (e.g., by monitoring data signal 182 received from sensor(s) S2, described above, and/or other signals generated by safety anomaly sensors or other sources). When the various safety signals indicate that base-generating device 110 cannot be operated safely, control may pass on the NO branch from block 220 back to start block 201. For example, if operational safety signal 182 indicates that device 110 is disassembled for repair/maintenance or indicates that a dangerous situation may occur if device 110 were actuated, then the control algorithm prevents device 110 from operating, even though sufficient low/zero-carbon electricity is available, by way of diverting control back to start block 201. When the various safety signals indicate that base-generating device 110 can be operated safely, the control algorithm may pass control on the YES branch from block 220 to block 230. For clarity, each portion of time during which the control algorithm determines that base-generating device 110 can be operated safely is referred to as a second time period. Note that each second time period can occur during a first time period only. Accordingly, the control algorithm effectively restricts operations performed by base-generating device 110 to second time periods when both sufficient low/zero-carbon electricity is available and base-generating device 110 can be operated safely.

Referring to decision block 230, after verifying that sufficient low/zero-carbon electricity is available and that operating base-generating device 110 would be safe, the control algorithm may next determine whether supplying alkalinity product 113-OUT to seawater 51 may endanger, or benefit, sea life near outfall location 50-1. In one embodiment, control circuit 180 monitors ocean chemistry signal(s) 183 generated by sensor(s) S3 and/or data 183A to identify time periods during which supplying alkalinity product 113-OUT to seawater 51 generates zero or minimal risk of harm to sea life. In some embodiments, data 183A may include one or more of (a) optional environmental computational models capable of verifying that the alkalinity of seawater 51 near outfall location 50-1 (as measured by sensor S3) is changing the local seawater chemistry in an expected manner, the spreading of this added alkalinity in space and time and its equilibration with, and removal of, atmospheric $CO_2$, (b) pH, conductivity, volumetric flow and other sensor data received from base generating device 110 that indicate the availability and chemistry of alkalinity product 113-OUT, and/or (c) seawater chemistry data from additional ocean-based sensors (not shown) that may be placed at increasing distances from outfall location 50-1 to verify the model predictions. When the ocean chemistry signal(s) 183 and/or environmental model data 183A indicate that alkalinity product 113-OUT can be supplied safely, the control algorithm passes control on the YES branch from block 230 to block 240. For clarity, each portion of time during which the control algorithm determines that base-generating device 110 can safely supply alkalinity product 113-OUT is referred to as a third time period, where each third time period can occur during a first time period and a second time period only. Conversely, when either of ocean chemistry signal(s) 183 and/or environmental model data 183A indicates that supplying alkalinity product 113-OUT to seawater 51 endangers sea life, control may pass on the NO branch from block 230 to block 250. For example, if ocean chemistry signal(s) 183 indicate that the pH at outfall location 50-1 is too high to safely receive additional base substance, then the control algorithm temporarily can prevent device 110 from supplying additional alkalinity product 113-OUT to outfall location 50-1, even though sufficient low/zero-carbon electricity is available and device 110 can be operated safely.

Referring to block 240, the operations performed by base-generating device 110 can be controlled (e.g., by signal 185-1) such that the base-generating device 110 supplies alkalinity product 113-OUT to seawater 51 only during a fourth time period, the fourth time period comprising concurrent portions of all of the first, second and third time periods (mentioned above). That is, the control algorithm may control base-generating device 110 such that alkalinity product 113-OUT may be supplied to the ocean 50 when the input data (e.g., signals 181, 183 and 183) received by control circuit 180 indicates (1) sufficient low/zero-carbon electricity is available to operably power base-generating device 110, (2) base-generating device 110 is operably configured to safely generate and supply alkalinity product 113-OUT, and (3) supplying alkalinity product 113-OUT will not endanger, and is most likely to benefit, sea life in the ocean 50 (e.g., adjacent to the outfall location 50-1).

Referring to block 250, in some embodiments the operations performed by base-generating device 110 can be controlled (e.g., by signal 185-2) such that the base-generating device 110 performs one or more scheduled maintenance cycles during fifth time periods, where each fifth time period includes concurrent portions of the above mentioned first and second time periods but does not occur during a third time period (i.e., during periods when LCE power is available and it is safe to operate the BPED, but when supplying alkalinity product 113-OUT may endanger sea life). That is, the control algorithm executed by control circuit 180 may restrict the operations performed by device 110 to scheduled maintenance or other non-base-generating operations when the ocean alkalinity signals 183 and/or environmental model signals 183A indicate that supplying alkalinity product 113-OUT to seawater 51 may endanger sea life. In some embodiments, the scheduled maintenance cycles may include a maintenance cycle in which base-generating device 110 is operated to generate alkalinity product 113-OUT but stores the base material in an outgoing buffer tank during the fifth time periods (i.e., base-generating device 110 is not operated in a way that supplies base substance to the ocean during these maintenance cycles), and then base-generating device 110 is operated subsequently occurring fourth time period to pump (supply) the stored base substance from the outgoing buffer tank to the ocean. In other embodiments, the control algorithm may be configured to use data indicating the state of the outgoing base buffer tank, carbon market data, and ocean chemistry status data to determine, based on predictions of rate of base dispersal into the ocean in the near future and how full the outgoing base buffer tank is, whether to cause base-generating device 110 to generate base substance at that moment, or perform non-base-generating maintenance cycle operations such as the descaling/clean-in-place operation (described below with reference to FIG. 6B), or simply keep the system idle if that is the optimum action.

By configuring control circuit 180 (FIG. 1) to implement the method shown in FIG. 2 and described above, control circuit 180 may provide a closed loop control arrangement that increases the operating efficiency of OAE system 100 and reduces the cost of $CO_2$ capture by way of allowing OAE system 100 to run autonomously and continuously. This arrangement also addresses the additionality issue associated with conventional approaches by restricting high-power-consuming operations (e.g., base generation) to time periods when sufficient low/zero carbon electricity is available, minimizes environmental impact by restricting base-generating operations to time periods when base-generating device 110 can be operated safely, and by generating alkalinity product 113-OUT with molecular base substance that reliably and predictably disperses from region 54 into surrounding seawater 51, and meets the need for measurability and verification by way of utilizing ocean-based sensor S3 to verify the predictable dispersion of the base substance molecules. Using established permanence calculating methods, the $CO_2$ capture approach described herein may have a permanence of approximately 10,000 years. That is, the durability of $CO_2$ storage in the ocean using the approach described herein is essentially equal to the residence lifetime of excess alkalinity added to seawater, which can be calculated by dividing the total alkalinity (TA) concentration ($3 \times 10^6$ Tmol alkalinity) by the approximately 33 Tmol/yr TA input into the ocean through rivers (see Cai et al., Continental Shelf Research, 28, 1538-1549, 2008). This calculation gives a residence estimate of about 100,000 years, as supported by the conclusions of Renforth et al., Rev. Geophys., 55, 636-674, 2017. However, there are reasons to believe that the removal of alkalinity is proportional to the degree of supersaturation rather than the concentration. This, in turn implies that excess alkalinity might have a residence time of around 10,000 years, shorter than the residence time of alkalinity.

Figure 3:
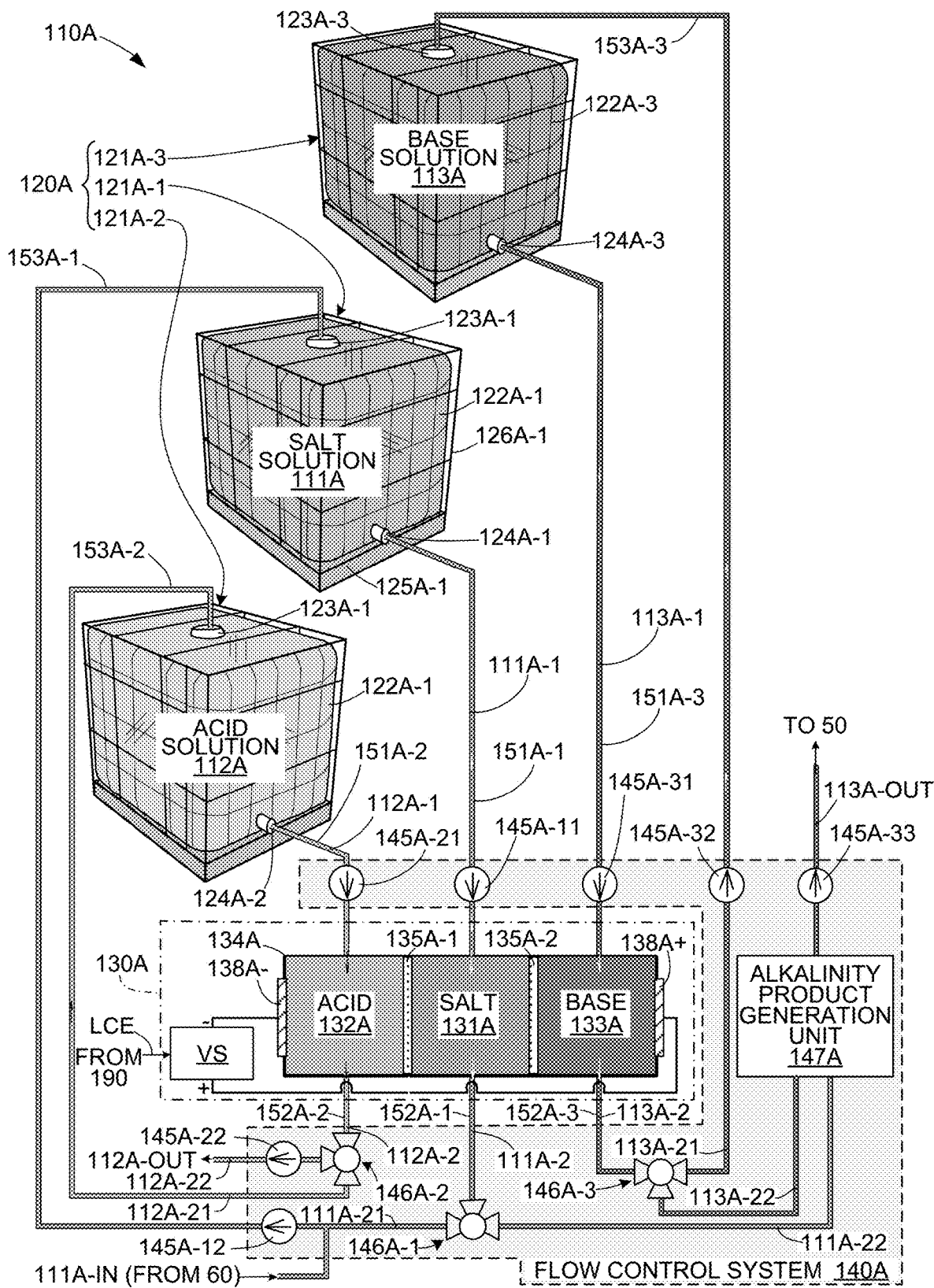
FIG. 3 is a modified diagram depicting a bipolar electrodialysis (BPED) system that may be utilized as a base-generating device by the OAE system of FIG. 1 according to an embodiment.

FIG. 3 shows a generalized bipolar electrodialysis (BPED) system 110A that generally includes a fluid buffering system 120A, an electrodialysis apparatus 130A, a flow control system 140A and a series of flow lines that are described in additional detail below. As explained in the following paragraphs, BPED system 110A may generate both an alkalinity product 113A-OUT and an acid substance 112A-OUT by processing an externally supplied feedstock solution (e.g., seawater 50-1 or brine 66 from salt feedstock 60, as described above with reference to FIG. 1). In some embodiments, BPED system 110A may be utilized by OAE system 100 in place of base-generating device 110 (FIG. 1), whereby operations performed by BPED system 110A may be controlled in accordance with the method described above with reference to FIG. 2.

Referring to the upper portion of FIG. 3, fluid buffering system 120A can include at least three main buffer tanks: a salt (first) buffer tank 121A-1 utilized to receive and store feedstock (salt) solution 111A, an acid (second) buffer tank 121A-2 utilized to store an acid solution 112A, and a base (third) buffer tank 121A-3 utilized to store a base solution 113A. In an embodiment, each buffer tank 121A-1 to 121A-3 can be implemented using a standard 1000L IBC caged tote tank, where salt buffer tank 121A-1 includes a plastic containment unit 122A-1 having an inflow port 123A-1 and an outflow port 124A-1, acid buffer tank 121A-2 includes a plastic containment unit 122A-2 having an inflow port 123A-2 and an outflow port 124A-2, and base buffer tank 121A-3 includes a plastic containment unit 122A-3 having an inflow port 123A-3 and an outflow port 124A-3. In other embodiments, such as those described below with reference to FIGS. 7 to 9, fluid buffering system 120A may be modified to include one or more additional buffer tanks that may be utilized to store, for example, fresh or deionized water or intermediate solutions utilized by BPED system 110A. In some embodiments additional buffer tanks may be utilized to store previously generated base substance and acid substance solutions, thereby allowing the control algorithm to decouple the best time to generate acid and base substances (e.g., when electricity carbon intensity and price are most favorable) from the best time to supply the base substance into the ocean (i.e., as determined at least partially by data from seawater chemistry sensors).

Electrodialysis apparatus 130A may utilize known electrochemical techniques to split NaCl (salt) molecules provided in feedstock solution 111A into Na+ and Cl− ions, to enhance (i.e., decrease the pH of) acid solution 112A by transferring the Cl− ions from feedstock solution 111A to acid solution 112A, and to enhance (i.e., increase the pH of) base solution 113A by transferring the Na+ ions from feedstock solution 111A to base solution 113A. As depicted in greatly simplified form in FIG. 3, electrodialysis apparatus 130A may include a salt chamber 131A, an acid chamber 132A and a base chamber 133A that are arranged in series and collectively form an ion exchange stack 134A, where each pair of adjacent chambers is separated by an intervening ion-permeable membrane (filter) 135A-1 and 135A-2 (i.e., membrane 135A-1 separates acid chamber 132A from adjacent salt chamber 131A, and membrane 135A-2 separates salt chamber 131A from adjacent base chamber 133A). Ion exchange stack 134A can be surrounded by a water-tight containment housing (not shown) to facilitate the flow of feedstock solution 111A through salt chamber 131A, the flow of acid solution 112A through acid chamber 132A, and the flow of base solution 113A through base chamber 133A. To achieve a predetermined electrochemical process, a cathode 138A− and an anode 138A+ may be disposed at opposite ends of ion exchange stack 134A and generate an electric field through the chambers in response to an applied voltage differential provided by a suitable voltage source VS, thereby electrochemically processing the salt, acid and base streams in the manner described in additional detail below.

Flow control system 140A can include various control elements (e.g., pumps, valves etc.) that are collectively configured to direct streams of the salt, acid and base solutions from buffer tanks 121A-1 to 121A-3 through corresponding chambers of electrodialysis apparatus 130A and then back to buffer tanks 121A-1 to 121A-3 by way of associated conduits (flow lines). For example, a salt stream 111A-1 comprises a portion of feedstock solution 111A that exits (flows from) salt buffer tank 121A-1 by way of outflow port 124A-1 and is directed into salt chamber 131A by way of salt inflow line 151A-1 and a first pump 145A-11. A salt stream 111A-2 may comprise processed (depleted salt) feedstock solution exiting salt chamber 131A by way of salt outflow line 152A-1, with a first portion 111A-21 being returned to salt buffer tank 121A-1 by way of optional three-way valve 146A-1, a second pump 145A-12 and salt return line 153A-1. Similarly, acid stream 112A-1 may exit acid buffer tank 121A-2 and is directed into acid chamber 132A by way of acid inflow line 151A-2 and a pump 145A-21, and acid stream 111A-2 exits acid chamber 132A by way of acid outflow line 152A-2, with a first portion 112A-21 being returned to acid buffer tank 121A-2 by way of optional three-way valve 146A-2, a pump 145A-22 and acid return line 153A-2. Similarly, base stream 113A-1 may exit base buffer tank 121A-3 and is directed into base chamber 133A by way of base inflow line 151A-3 and a pump 145A-31, and a portion 113A-21 of base stream 113A-2 exiting base chamber 133A by way of base outflow line 152A-3 is returned to base buffer tank 121A-3 by way of three-way valve 146A-3, pump 145A-32 and base return line 153A-3. As indicated at the bottom of FIG. 3, in some embodiments externally supplied feedstock solution 111A-IN is fed from an external source (e.g., from salt feedstock 60 as shown in FIG. 1) and transmitted with depleted salt stream portion 111A-21 to salt buffer tank 121A-1 by way salt return line 153A-1. In a similar manner, in some embodiments water may be supplied from one or more external sources to replace the outflow volumes represented by acid sub-stream 112A-22 and base sub-stream 113A-22. For example, in some embodiments base generating device 110A may be utilized to process a brine stream generated by a desalination (or water treatment) plant, and fresh water generated by the desalination plant may be supplied to base buffer tank 121A-3 and/or acid buffer tank 121A-2 to replace the outflow volumes represented by base sub-stream 113A-22 and acid sub-stream 112A-22.

As mentioned above and described in additional detail below with reference to FIG. 4, the compositions of the acid and base solutions may change (strengthen) as they pass through electrodialysis apparatus 130A during base-generating operations. That is, the acidity of acid stream 112A-2 leaving electrodialysis apparatus 130A may be relatively strong in comparison to the acidity of acid stream 112A-1 due to its higher acid concentration (i.e., due to the addition of HCl molecules formed in the acid solution passing through acid chamber 132A). Similarly, the pH of base stream 113A-2 may be higher than that of stream 113A-1 due to the addition of NaOH molecules as the base solution passes through base chamber 133A). Accordingly, for descriptive purposes acid streams 112A-1 and 112A-2 are referred to herein as weak acid stream 112A-1 and strong acid stream 112A-2, and base streams 113A-1 and 113A-3 are referred to herein as weak base stream 113A-1 and strong base stream 113A-2. For similar reasons, salt streams 111A-1 and 111A-2 are referred to as strong salt stream 111A-1 and depleted salt stream 111A-2, respectively, to indicate that salt is removed from the feedstock solution as it passes through salt chamber 131A.

During base-generating operations, electrodialysis apparatus 130A can utilize low/zero-carbon electricity LCE received, for example, from power distribution circuit 190 (see FIG. 1), to generate both strong acid stream 112A-2 and strong base stream 113A-2 by processing strong salt stream 111A-1 as described herein. In some embodiments, BPED system 110A is operated in a "feed and bleed" mode wherein portions (sub-streams) of both strong acid stream 112A-2 and strong base stream 113A-2 are bled off (diverted) for use in the generation of alkalinity product 113A-OUT or other purposes. For example, in some embodiments strong acid stream 112A-2 is divided such that a first acid sub-stream 112A-21 is directed back to acid buffer tank 121A-2 and a second acid sub-stream 112A-22 is directed out of BPED system 110A for use as an acid product 112A-OUT by way of three-way valve 146A-3 and an associated pump 145A-32. Similarly, strong base stream 113A-2 is divided into two sub-streams by three-way valve 146A-3, with a first base sub-stream 113A-21 being directed back to base buffer tank 121A-3, and a second base sub-stream 113A-22 being directed to an alkalinity product generation unit 147A by way of three-way valve 146A-3. As described in additional detail below with reference to FIGS. 10 and 11, alkalinity product generation unit 147A can be configured to generate ocean alkalinity product 113A-OUT by processing base sub-stream 113A-22 (e.g., mixing with a second portion 111A-22 of depleted salt stream 111A-2) and verifying that alkalinity product 113A-OUT has a pH level that suitable for mixing with seawater before being pumped to ocean 50 (e.g., by way of pump 145A-33).

Figure 4:
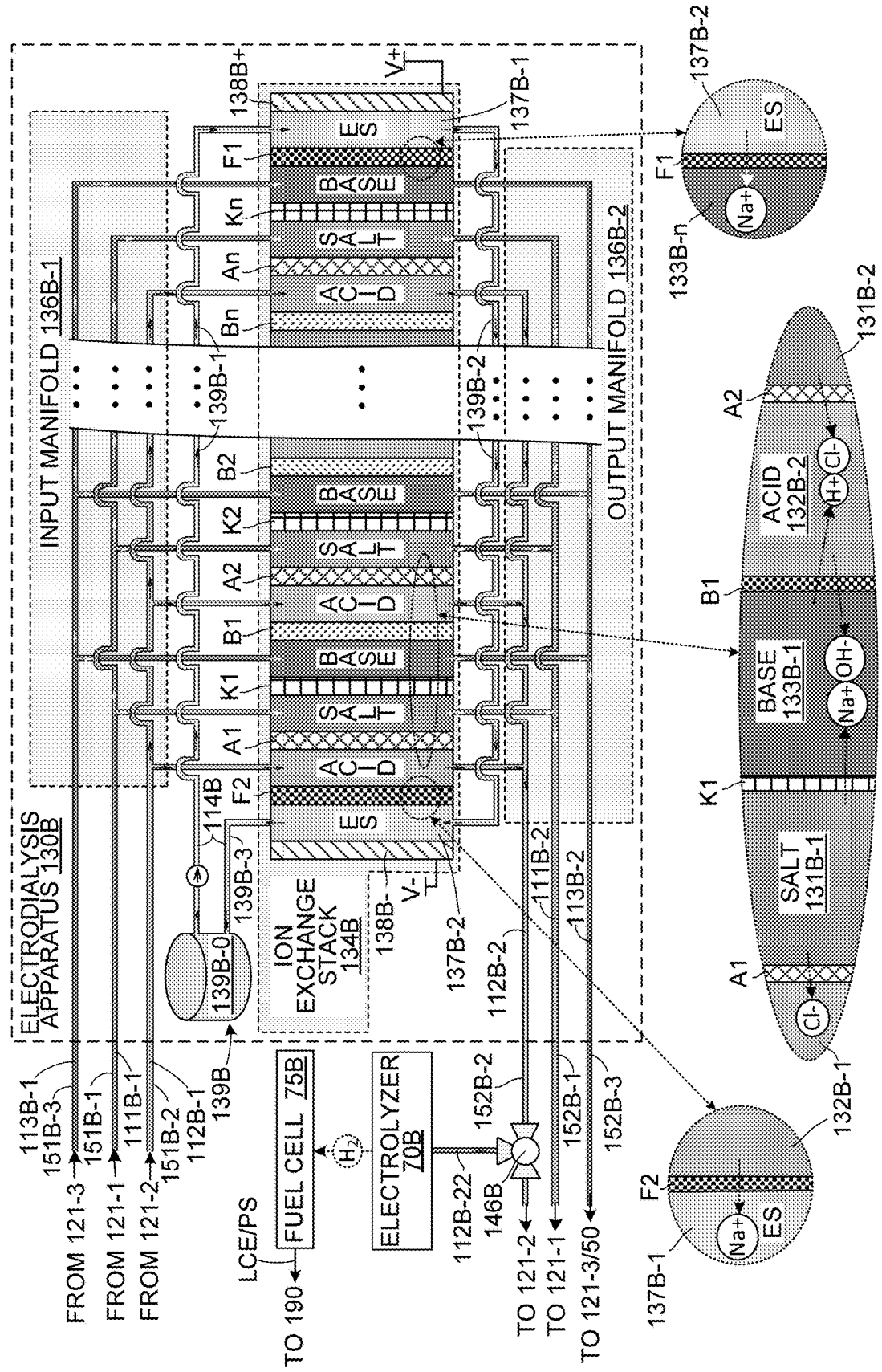
FIG. 4 is a modified diagram depicting an electrodialysis apparatus that may be utilized by the BPED system of FIG. 3 according to an exemplary embodiment.

FIG. 4 shows a portion of a BPED system 110B including an electrodialysis unit 130B that includes an ion exchange stack 134B, an input manifold 136B-1, an output manifold 136B-2 and an electrolyte solution circulation system 139B. Electrodialysis unit 130B may provide additional details regarding the multiple acid, salt and base chambers described above with reference to electrodialysis unit 130A (FIG. 3). That is, in some embodiments electrodialysis unit 130A (FIG. 3) is configured to include the features and details of electrodialysis unit 130B.

Ion exchange stack 134B may include multiple acid, salt and base chambers respectively indicated by "ACID", "SALT", and "BASE" disposed in a repeating series arrangement between two end chambers 137B-1 and 137B-2. Each of the acid, salt and base chambers of ion exchange stack 134B may function as described above with reference to acid chamber 132A, salt chamber 131A and base chamber 133A, respectively, to process a corresponding portion of one of the acid, salt and base solution streams directed through ion exchange stack 134B by way of input manifold 136B-1 and output manifold 136B-2. That is, input manifold 136B-1 may split weaker acid stream 112B-1 (which is received from an acid buffer tank 121-2 (not shown) by way of acid inflow line 151B-2) such that a portion of the acid stream passes through each acid chamber. Similarly, input manifold 136B-1 may split weaker base stream 113B-1 (which is received from a base buffer tank 121-3 (not shown) by way of base inflow line 151B-3) and splits salt stream 111B-1 (which is received from a salt buffer tank 121-1 (not shown) by way of salt inflow line 151B-1) such that a portion of the base stream passes through each base chamber and a portion of the salt stream passes through each salt chamber. End chambers 137B-1 and 137B-2 may function to conduct an electrolyte solution indicated by "ES" for purposes described below.

Ion exchange stack 134B may include four types of ion permeable membranes that are respectively disposed between adjacent acid, salt, base and end chambers and facilitate the ion transfer process utilized to strengthen the base stream and the salt stream during operation of BPED 110B (i.e., when ion exchange stack 134B receives an electric field generated applying voltage potentials V+ and V− to anode 138B+ and cathode 138B−, respectively). The four types of membranes are indicated in FIG. 4 using the prefixes "A", "K", "B" and "F", where membranes A1 to An are anion exchange membranes, membranes K1 to Kn are cation exchange membranes, membranes B1 to Bn are bipolar membranes, and membranes F1 and F2 are end membranes having characteristics described below. Anion exchange membrane materials, cation exchange membrane materials and bipolar membrane materials capable of functioning as described below can be used. In one embodiment membranes A1 to An, K1 to Kn and B1 to Bn are implemented using a stack of cell trebles, where each cell treble includes an anion exchange membrane, a cation exchange membrane and a bipolar membrane. Anion exchange membranes A1 to An represent a first membrane type that is configured to facilitate the transfer of Cl− ions from each salt chamber into an adjacent acid chamber. For example, the elongated bubble at the bottom of FIG. 4 depicts the transfer of a first Cl− ion from salt chamber 131B-1 to acid chamber 132B-1 through membrane A1, and the transfer of a second Cl− ion from salt chamber 131B-2 to acid chamber 132B-2 through membrane A2. Cation exchange membranes K1 to Kn represent a second membrane type that facilitates the transfer of Na+ ions from each salt chamber into an adjacent base chamber. For example, the elongated bubble at the bottom of FIG. 4 depicts the transfer of a Na+ ion from salt chamber 131B-1 to base chamber 133B-1 through membrane K1. Bipolar membranes B1 to Bn represent a third membrane type that facilitates the transfer of hydrogen ions H+ from each base chamber into an adjacent acid chamber and the transfer of hydroxide ions OH− from the adjacent acid chamber into the adjacent base chamber. For example, the elongated bubble at the bottom of FIG. 4 depicts the transfer of an H+ ion from base chamber 133B-1 to acid chamber 132B-2 through membrane B1, and the transfer of an OH− ion from acid chamber 132B-2 to base chamber 133B-1 through membrane B1. In some embodiments, membrane B1 includes a catalyst layer sandwiched between a cation exchange layer and an anion exchange layer, with the catalyst layer functioning to dissociate water molecules that diffuse into membrane B1 from either acid chamber 132B-2 or base chamber 133B-1, the cation exchange layer functioning to pass H+ ions of the dissociated water molecules into acid chamber 132B-2, and the anion exchange layer functioning to pass OH− ions of the dissociated water molecules into base chamber 133B-1. Note the suffix "n" is used with reference to the various membranes and chambers merely to signify multiple iterations of each membrane/chamber type (e.g., references to "133n", "Kn" and "Bn" are not intended to mean that there are an identical number of base chambers, membranes B and/or membranes K). Membranes F1 and F2 may facilitate or reject the transfer of Na+ ions from each end chamber into an adjacent acid, base, or salt chamber depending on the order of the cell treble stack. Membranes F1 and F2 may be Nafion, cation exchange, anion exchange, or other ion exchange membranes that facilitate the required ion transfer function. For example, the circular bubble at the lower right portion of FIG. 4 depicts the transfer of an Na+ ion from end chamber 137B-1 to adjacent base chamber 133B-n through membrane F1, and the circular bubble at the lower left portion of FIG. 4 depicts the transfer of an Na+ ion from acid chamber 131B-1 into end chamber 137B-2.

Electrolyte solution circulation system 139B may include a reservoir 139B-0 and flow lines 139B-1 to 139B-3 that function to circulate an electrolyte solution 114B through end chambers 137B-1 and 137B-2. That is, electrolyte solution 114B can be pumped from reservoir 139B-0 along first flow line 139B-1 to first end chamber 137B-1, from end chamber 137B-1 along second flow line 139B-2 to second end chamber 137B-2, and from second end chamber 137B-2 along third flow line 139B-3 to reservoir 139B-0. In some embodiments (not pictured) it may be desired to separate the electrolytes so that cathode and anode are two fluid circuits. During operation the electrolyte solution may give up Na+ ions at one end of ion exchange stack 134B (e.g., as indicated by the Na+ ion passing from end chamber 137B-1 to base chamber 133B-n in the bubble view shown in the lower right portion of FIG. 4) and reabsorbs Na+ ions at the opposing end of ion exchange stack 135B (e.g., as indicated by the Na+ ion passing from acid chamber 132B-1 to end chamber 137B-2 in the bubble view shown in the lower left portion of FIG. 4). In some embodiments, electrolyte solution 114B is implemented using sodium sulfate or a semi conductive solution such as sodium hydroxide.

In some embodiments, BPED system 110B may be operated in "feed and bleed" operating mode in which portions of both stronger base stream 113B-2 and stronger acid stream 112B-2 are diverted (bled) out of the buffer-tank/electrolyzer flow cycle. That is, as described above, a portion of stronger base stream 113B-2 can be diverted (bled off) and supplied to the ocean (e.g., by way of valve 146A-3 described above with reference to FIG. 3). In addition, as shown in FIG. 4, a first portion 112B-21 of stronger acid stream 112B-2 exiting electrodialysis apparatus 130B is returned to the acid buffer tank (not shown), and a second portion 112B-22 of stronger acid stream 112B-2 is bled off by way of a valve 146B. In some embodiments the bled-off (second) stream portion 112B-22 can be processed or otherwise utilized as feedstock for generating a commercial product. In one embodiment, BPED system 110B includes an electrolyzer 70B that receives and processes acid stream portion 112B-22 to generate hydrogen gas $H_2$, and a fuel cell 75B that processes the hydrogen gas $H_2$ to generate supplemental low/zero-carbon electricity LCE/PS to further enhance the economically sustainability of a OAE system 100B as a carbon offset system (e.g., by way of transmitting supplemental electricity LCE/PS to power distribution circuit 190 (FIG. 1) for use by OEA system 100). In some embodiments, one or more additional gasses, such as chlorine gas $Cl_2$ and/or oxygen gas $O_2$, may be produced (e.g., in addition to or as an alternative to hydrogen gas $H_2$), and such gases may be sold to further enhance the economically sustainability of a OAE system 100B as a carbon offset system. It may be desirable to treat acid stream portion 112B-22 before undergoing the electrolyzation process. Some possible methods of pretreatment, not pictured, may include filtration, chemical, electrochemical, nanofiltration, ultrafiltration, reverse osmosis, heating, and cooling. In other embodiments, not pictured, hydrogen gas from reservoir 139B-0 can be fed to fuel cell 75B, or the acid can be utilized in a flow battery to produce supplemental low/zero-carbon electricity to help offset input power.

Figure 5:
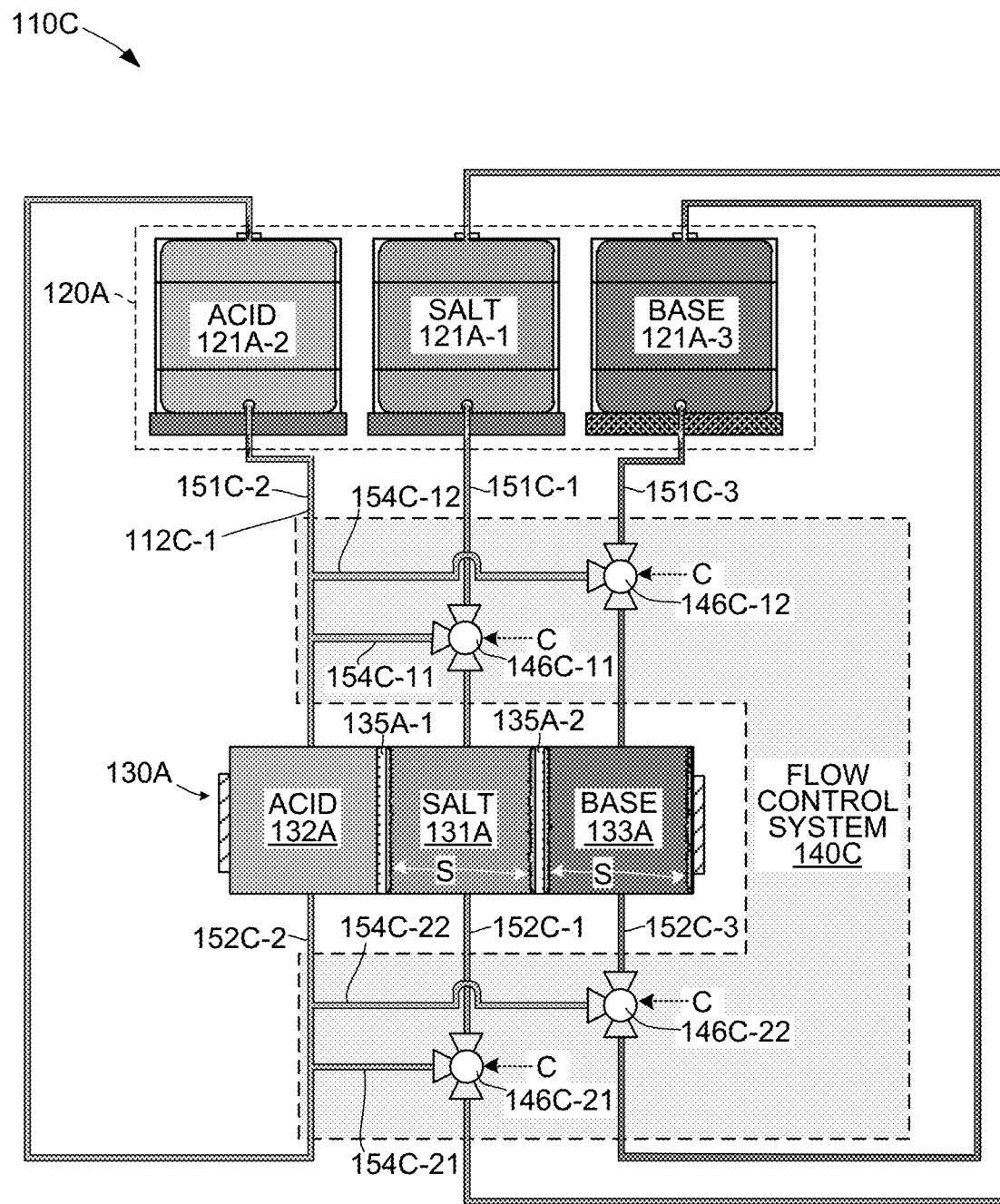
FIG. 5 is a diagram depicting a modified BPED system according to another embodiment.

FIG. 5 shows a BPED system 110C including a flow control system 140C that is modified as described below to facilitate descaling (maintenance) operations during maintenance cycles. In some embodiments, BPED system 110C may be utilized to perform the function of base-generating device 110 in OAE system 100 (FIG. 1). In other embodiments BPED system 110C may be utilized in conjunction with other applications that benefit from the functions provided by BPED system 110C, such as in desalination or water recycling plants. BPED system 110C may include fluid buffering system 120A, electrodialysis apparatus 130A, modified flow control system 140C and a series of flow lines that may be configured and operate in a manner consistent with any of the embodiments described herein. For purposes of brevity, fluid buffering system 120A and electrodialysis apparatus 130A are configured and function as described above with reference to FIG. 3. BPED system 110C is greatly simplified to emphasize the novel characteristics associated with modified flow control system 140C. To this end, the novel characteristics of BPED system 110C are generically described with reference to fluid buffering system 120A, electrodialysis apparatus 130A and associated flow lines that may be configured and operate in a manner consistent with any of the embodiments described herein. Additional fluid flow system features, control circuitry, sensors and other devices that may be required to perform the BPED operations can be used.

As indicated in FIG. 5, normal operations of BPED systems like system 110C can produce fouling and scaling S on membranes 135A-1 and 135A-2, and it is sometimes desirable to flush salt chamber 131A and/or base chamber 133A with an acidic fluid to remove the scaling. According to the present embodiment, modified flow control system 140C may include three-way valves 146C-11, 146C-12, 146C-21 and 146C-22 that are configured to facilitate an acid flush process during maintenance operations by way of selectively feeding acid stream 112C-1 from acid buffer tank 121C-1 to salt chamber 131A and base chamber 133A. In some embodiments, a first valve 146C-11 may be disposed in salt inflow line 151C-1 and may communicate with acid inflow line 151C-2 by way of a first cross-feed line 154C-11, a second valve 146C-12 may be disposed in base inflow line 151C-3 and may communicate with acid inflow line 151C-2 by way of a second cross-feed line 154C-12, a third valve 146C-21 may be disposed in salt outflow line 152C-1 and may communicate with acid outflow line 152C-2 by way of a third cross-feed line 154C-21, and a fourth valve 146C-22 may be disposed in base outflow line 152C-3 and may communicate with acid outflow line 152C-2 by way of a fourth cross-feed line 154C-22. Each three-way valve 146C-11, 146C-12, 146C-21 and 146C-22 may be controlled by way of a control signal C generated by the BPED system's control circuit (not shown) to either facilitate normal BPED system operations (as depicted and described with reference to FIG. 6A) or to operate in a maintenance cycle in which valves 146C-11, 146C-12, 146C-21 and 146C-22 work in concert to divert portions of acid stream 102C-1 from acid buffer tank 121A-2 into one or both of fluid chambers 131A and 133A.

Figure 6A:
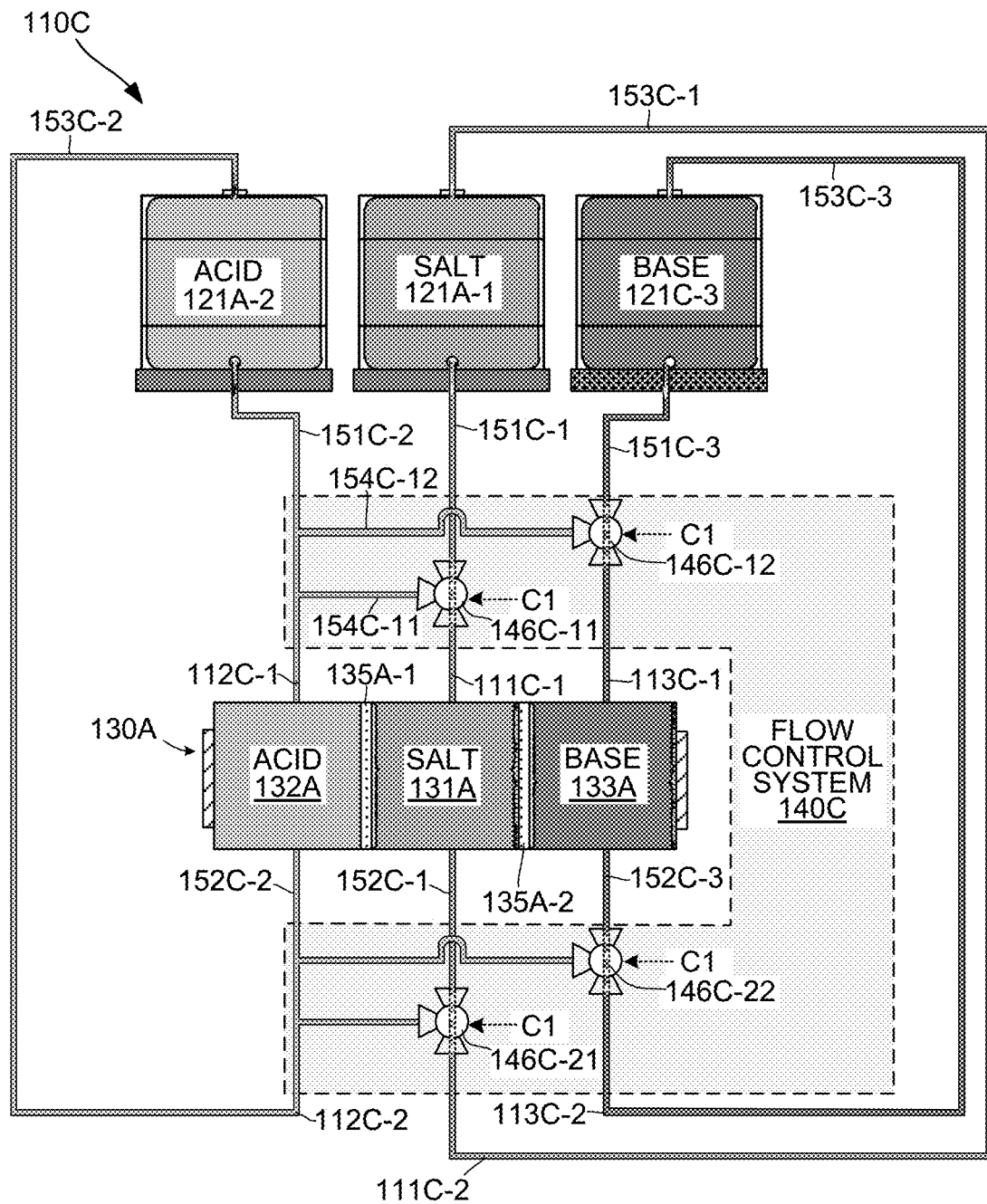
FIGS. 6A and 6B are modified diagrams depicting the BPED system of FIG. 5 during base-generating operations and maintenance operations, respectively.

FIG. 6A depicts modified BPED system 110C as effectively configured by the associated control circuit (not shown) during base-generating (normal) operations. During the (first) time periods associated with normal operations the control circuit (not shown) transmits a first control signal C1 that deactivates (turns off) valves 146C-11 to 146C-22, whereby valves 146C-11 to 146C-22 enter the operating state depicted in FIG. 6A. Specifically, flow along cross-feed lines 154C-11 and 154C-12 can be prevented when valves 146C-11 and 146C-12 are turned off, whereby weak acid stream 112C-1 is directed by acid inflow line 151C-2 through acid chamber 132A, and strong acid stream 112C-2 is directed by acid outflow line 152C-2 and acid return line 153C-2 back to acid buffer tank 121C-2. Similarly, when valves 146C-11 and 146C-21 are turned off, salt stream 111C-1 can be directed by salt inflow line 151C-1 through salt chamber 131A, and depleted salt stream 111C-2 directed by salt outflow line 152C-1 and salt return line 153C-1 back to salt buffer tank 121C-1. Finally, when valves 146C-12 and 146C-22 are turned off, weak base stream 113C-1 can be directed by base inflow line 151C-3 through base chamber 133A, and strong base stream 113C-2 is directed by base outflow line 152C-3 and base return line 153C-3 back to base buffer tank 121C-3. Although not shown in FIG. 6A, portions of strong acid stream 112C-2 and strong base stream 113C-2 may be bled off during base-generating operations, as described above with reference to FIGS. 3 and 4.

Figure 6B:
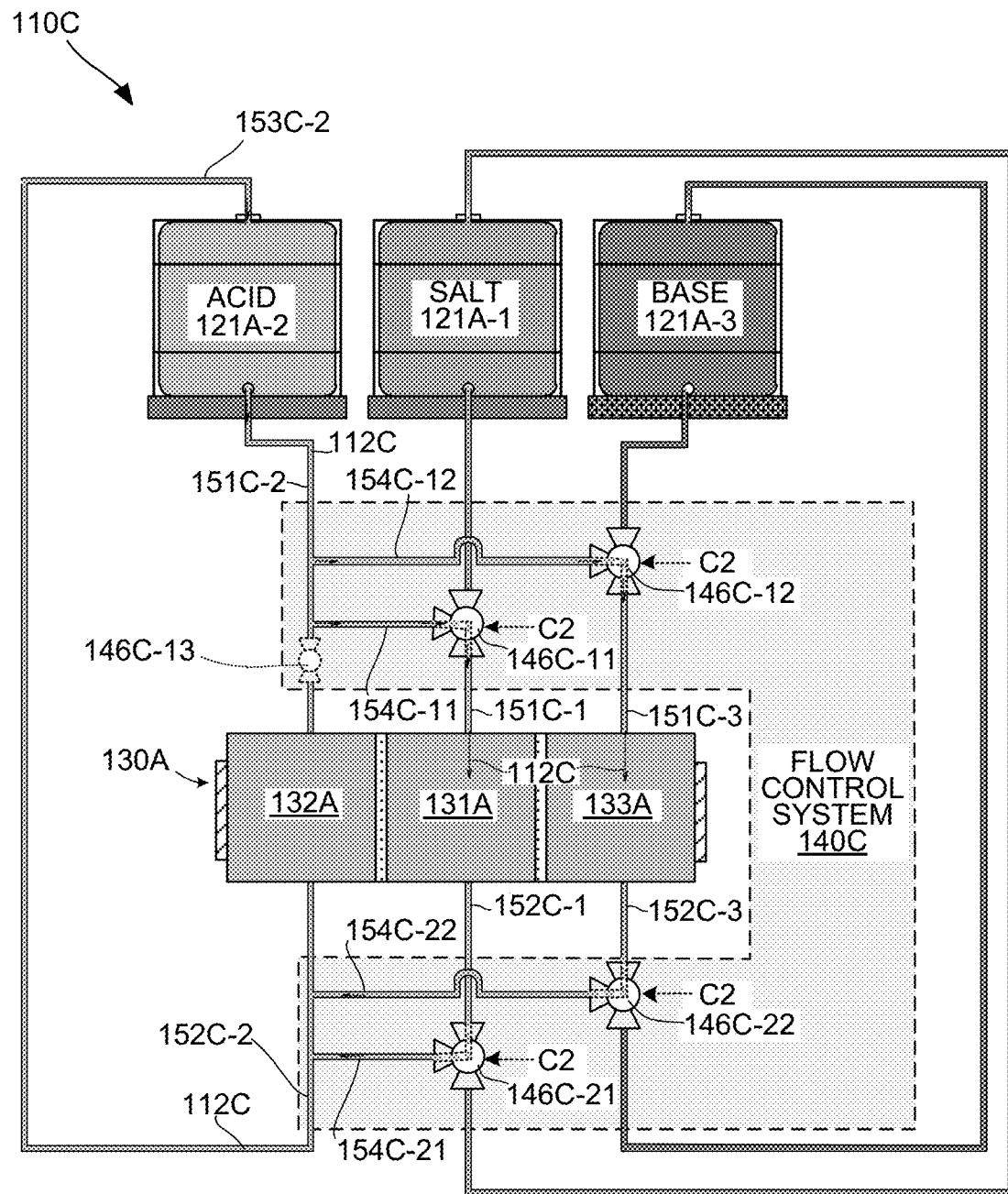

FIG. 6B depicts modified BPED system 110C as effectively configured during an acid-flush (maintenance cycle) operation. During the (second) time periods associated with acid-flush operations the control circuit (not shown) transmits a second control signal C2 to valves 146C-11 to 146C-22. In some embodiments, control signal C2 causes valves 146C-11 and 146C-12 to divert the inflow of acid 112C from acid buffer tank 121C-2 into salt chamber 131A and base chamber 133A by way of acid inflow line 151C-2 and cross-feed lines 154C-11 and 154C-12, and causes valves 146C-21 and 146C-22 to divert the outflow of acid 112C from salt chamber 131A and base chamber 132A back to acid buffer tank 132A by way of cross-feed lines 154C-21 and 154C-22, acid outflow line 152C-2, and acid return line 153C-2. That is, during acid-flush operations the control circuit (not shown) may actuate valves 146C-11 and 146C-12 such that at least a portion of acid solution 111C-1 flows from acid buffer tank 121C-2 to both salt chamber 131A and base chamber 133A, whereby accumulated scaling material disposed in salt chamber 131A and base chamber 133A is dissolved or otherwise removed by contact with the acid solution. An optional two-way valve 146C-13 may be included in acid inflow line 151C-2 between the junction with cross-feed line 154C-12 and acid chamber 132A and controlled to prevent acid flow through acid chamber 132A to further increase acid flow through salt chamber 131A and base chamber 133A during acid flush operations. In some embodiments, all four valves 146C-11 to 146C-22 may be turned on simultaneously (e.g., as indicated in FIG. 6B), and in other embodiments the acid-flush of salt chamber 131A and base chamber 133A may be performed one at a time (e.g., by activating valves 146C-11 and 146-21 while deactivating valves 146C-12 and 146-22, and subsequently deactivating valves 146C-11 and 146-21 while activating valves 146C-12 and 146-22). Alternative embodiments may use motor controlled 3-way valves or 2-way valves with piping bypass, motorize controlled valves, and metering valves, pneumatically controlled valves, or any combination thereof.

Figure 7:
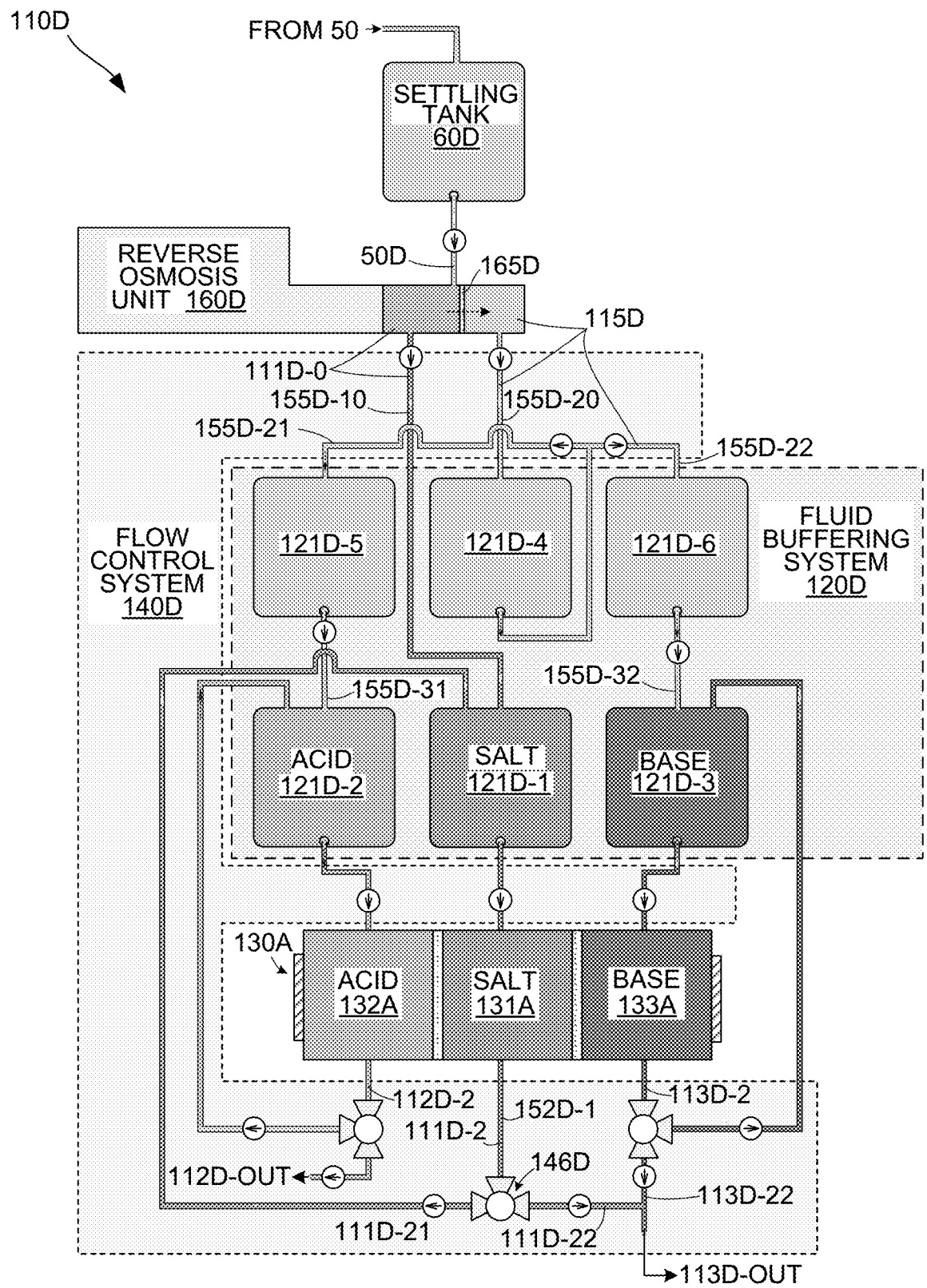
FIG. 7 is a diagram depicting a modified BPED system including a reverse-osmosis-type pretreatment unit according to another embodiment.
Figure 8:
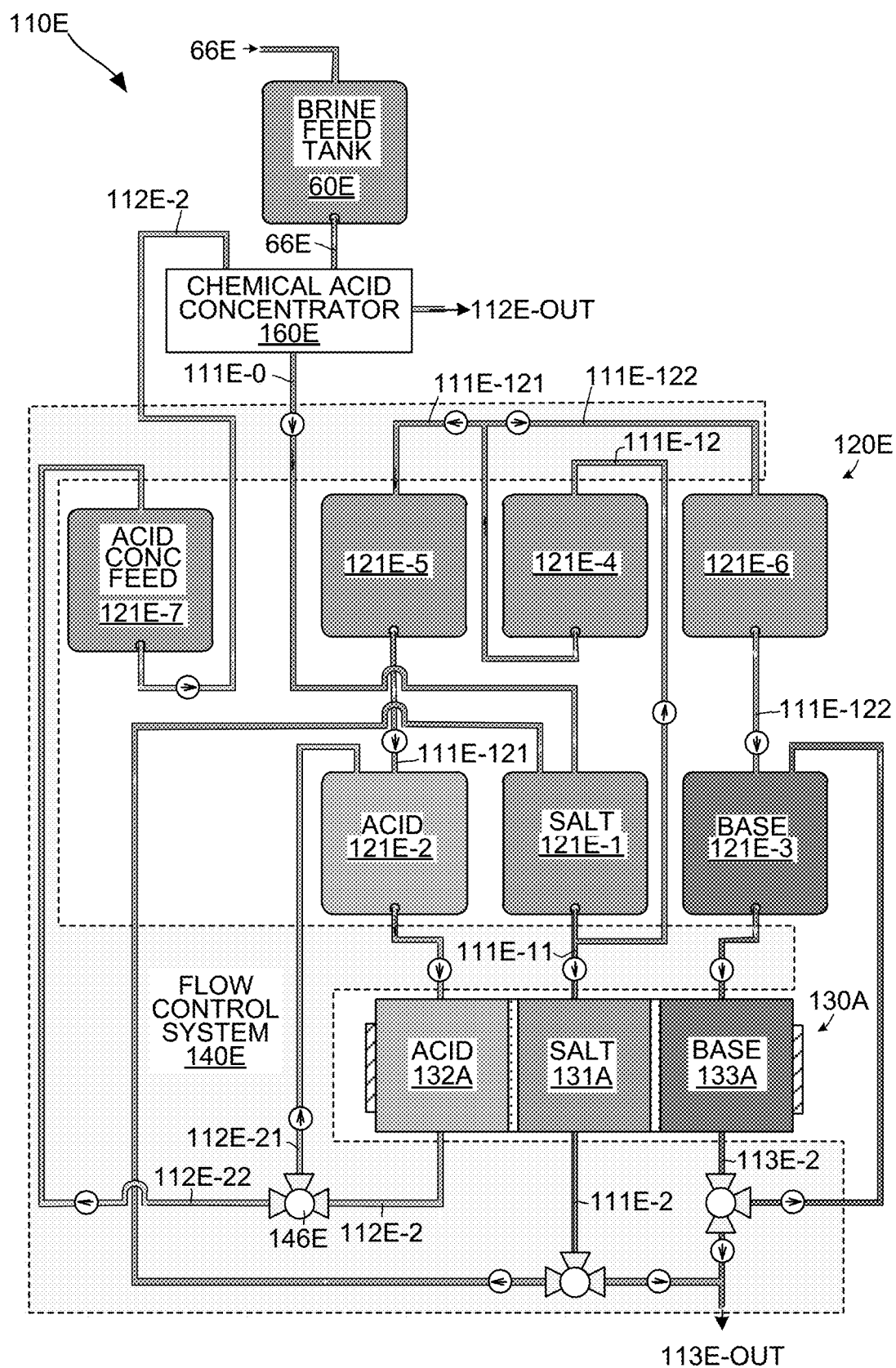
FIG. 8 is a diagram depicting a modified BPED system including a chemical-acid-concentrator-type pretreatment unit according to another embodiment.
Figure 9:
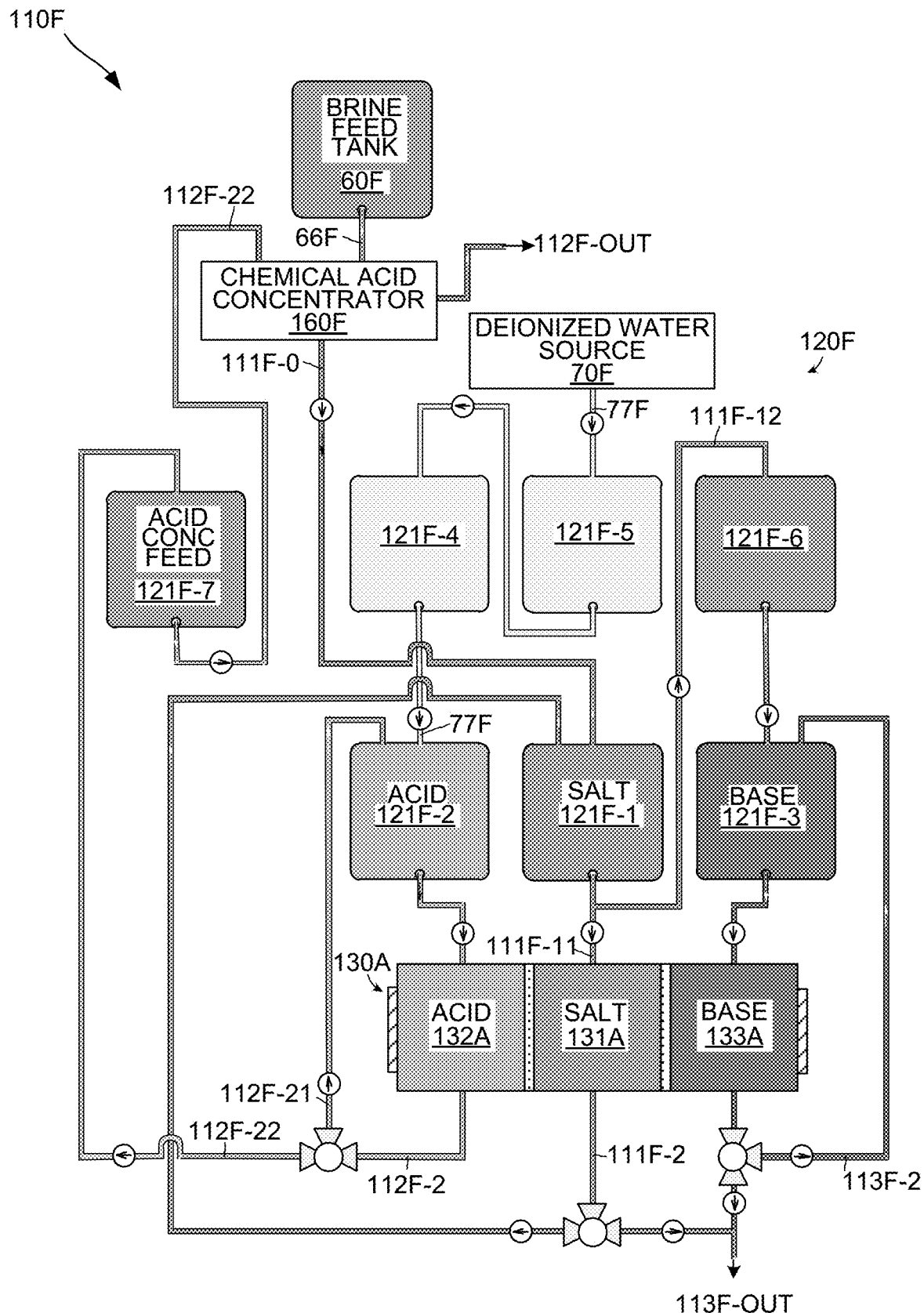
FIG. 9 is a diagram depicting a modified BPED system including a chemical-acid-concentrator-type pretreatment unit according to another embodiment.

FIGS. 7 to 9 depict BPED systems according to three embodiments in which the need for an external fresh water supply is reduced or eliminated by partially or fully desalinating (pretreating) the available salt feedstock. When readily available, an external fresh water supply can be used to replace liquid volumes that are bled out of the BPED system during the feed-and-bleed operations described above (e.g., outgoing base stream 113A-21 described above with reference to FIG. 3 and/or outgoing acid stream 112B-21 described above with reference to FIG. 4). Replacing the lost liquid volume with fresh water (when available) may provide the benefit of maintaining the purity of the outgoing base and acid product. However, to maximize ocean deacidification while minimizing danger to sea life it may become necessary to deploy multiple OAE systems at corresponding locations around the periphery of or on islands disposed in each ocean (i.e., to produce uniform diffusion of base material to the ocean's seawater). To achieve uniform diffusion, it may become necessary to deploy some of the OEA systems in remote locations where a reliable fresh water supply may be unavailable. The BPED systems described below with reference to FIGS. 7 to 9 can be modified to include a pretreatment unit that reduces or eliminates a host OAE system's dependence on a fresh water supply by at least partially desalinating an externally supplied feedstock solution and then utilizing the reduced-salt fluid to replace bled off acid and/or base solution (i.e., in place of processed or fresh water from an external source). Note that FIGS. 7 to 9 are greatly simplified and that additional BPED system features are omitted for brevity and clarity. For example, for reasons like those mentioned above with reference to BPED system 110C (FIGS. 5, 6A and 6B), each of the BPED systems depicted in FIGS. 7 to 9 is described with reference to generalized electrodialysis apparatus 130A. In addition, the flow control systems of each of the BPED systems depicted in FIGS. 7 to 9 is understood to include the depicted valves and pumps, even if the depicted valves/pumps are not specifically referenced as part of the associated flow control system in the description below. Finally, the flow control systems of each of the depicted BPED systems may be modified to include certain flow control features discussed above (e.g., the valves and cross-feed lines described above with reference to FIGS. 5, 6A and 6B).

FIG. 7 depicts a modified BPED system 110D including a reverse osmosis unit 160D that is used to process (pretreat) seawater 50D (salt feedstock). BPED system 110D can also include a fluid buffering system 120D and a flow control system 140D that are configured as described below to transmit salt, acid and base streams through an electrodialysis apparatus 130A to facilitate base-generation and acid generation operations similar to those described above.

Referring to the upper portion of FIG. 7, reverse osmosis unit 160D can be operably coupled between an optional settling tank (salt feedstock source) 60D and fluid buffering system 120D. Reverse osmosis unit 160D may process seawater 50D using known techniques and is depicted and described below in a greatly simplified form for brevity. In general, reverse osmosis unit 160D may utilize a filter 165D to separate salt and other minerals from seawater 50D, thereby generating a permeate (reduced-salt fluid) 115D and a concentrate (high-salt fluid) 111D-0.

Fluid buffering system 120D and flow control system 140D can be configured to receive and store concentrate 111D-0 and permeate 115D to facilitate base-generation and acid generation operations similar to those described above. Fluid buffering system 120D may include buffer tanks 121D-1, 121D-2 and 121D-3 that respectively store salt, acid and base solutions in the manner described above with reference to FIGS. 3 and 5. In general, flow control system 140D can be configured to direct concentrate 111D-0 to salt tank 121D-1, and to direct permeate 115D to 121D-2 and 121D-3. In one embodiment, concentrate 111D-0 is directly transmitted from reverse osmosis unit 160D to salt buffer tank 121D-1 by way of a first feed line 155D-10, and permeate 115D is directed from reverse osmosis unit 160D to acid buffer tank 121D-2 and base buffer tank 121D-3 by way of a second feed line 155D-20. In some embodiments fluid buffering system 120D includes one or more additional buffer tanks that may be utilized to facilitate the distribution of permeate 115D to acid buffer tank 121D-2 and base buffer tank 121D-3. In the specific embodiment depicted in FIG. 7, a first additional buffer tank 121D-4 receives permeate 115D from reverse osmosis unit 160D, and distributes portions of permeate 115D to a second buffer tank 121D-5 and a third buffer tank 121D-6 by way of intermediate lines 155D-21 and 155D-22, respectively, and then the distributed portions of permeate 115D are directed to acid buffer tank 121D-2 and base buffer tank 121D-3 by way of feed lines 155D-31 and 155D-32, respectively. In other embodiments a smaller or larger number of additional buffer tanks may be used or permeate 115D may be directly passed from reverse osmosis unit 160D to acid buffer tank 121D-2 and base buffer tank 121D-3. In each of these cases, salt-free water (permeate) 115D is directed to both acid buffer tank 121D-2 and base buffer tank 121D-3, and high-salt fluid (concentrate) 111D-0 is supplied to salt tank 121D-1.

Referring to the lower portion of FIG. 7, in some embodiments flow control system 140D is further configured to facilitate feed-and-bleed base-generating and acid-generating operations similar to those described above with reference to FIG. 5 (i.e., such that a portion of strong acid stream 112D-2 leaving acid chamber 132A can be diverted to provide acid substance 112D-OUT, and a portion 113D-22 of strong base stream 113D-2 leaving base chamber 133A is diverted to provide base substance 113D-OUT). In addition, flow control system 140D can be further modified to include an additional three-way valve 146D that splits depleted salt stream 111D-2 leaving salt chamber 131A on salt outflow line 152D-1 into two portions, whereby a first portion 111D-21 is returned to salt buffer tank 121D-1, and a second portion 111D-22 can be combined (mixed) with diverted base stream portion 113D-22 to form base substance 113D-OUT.

FIG. 8 depicts a modified BPED system 110E including a chemical acid concentrator unit 160E that is used to process (pretreat) brine 66E (salt feedstock) and a portion 112E-22 of strong acid stream 112E-2 in order to generate both a reduced-salt fluid 111E-0 (i.e., having a salt concentration lower than that of brine 66E) and a high-concentration acid 112E-OUT. BPED system 110E may also include a fluid buffering system 120E and a flow control system 140E that are configured as described below to transmit reduced-salt fluid 111E-0 to all three of a salt buffer tank 121E-1, an acid buffer tank 121E-2 and a base buffer tank 121E-3, and to direct salt, acid and base streams through an electrodialysis apparatus 130A to facilitate base-generation and acid generation operations similar to those described above.

Referring to the upper portion of FIG. 8, chemical acid concentrator unit 160E is operably coupled between an optional brine feed tank (salt feedstock source) 60E and fluid buffering system 120E. In one embodiment, chemical acid concentrator unit 160E is configured to process brine 66E and a portion of the acid stream 112E-2 using an osmotically-driven forward osmosis process in a manner that generates both reduced-salt fluid 111E-0 and a high-concentration acid 112E-OUT. Osmotically-driven forward osmosis processes are known in the art (see, for example, "Osmotic concentration of succinic acid by forward osmosis: Influence of feed solution pH and evaluation of seawater as draw solution", Jeng Yih Law et al. Chinese Journal of Chemical Engineering, Volume 26, Issue 5, May 2018, Pages 976-983), and those skilled in the art are capable of generating chemical acid concentrator unit 160E such that it implements the osmotically-driven forward osmosis process depicted in FIG. 8.

Fluid buffering system 120E and flow control system 140E can be configured to receive and store reduced-salt fluid 111E-0 and to facilitate base-generation and acid generation operations similar to those described above. Fluid buffering system 120E may include buffer tanks 121E-1, 121E-2 and 121E-3 that respectively store salt, acid and base solutions in the manner described above with reference to FIG. 7. In this embodiment, flow control system 140E can be configured to direct reduced-salt fluid 111E-0 to salt buffer tank 121E-1, and to direct a first portion 111E-11 of a salt stream 111E-1 exiting salt buffer tank 121E-1 to salt chamber 131A, and to direct a second portion 111E-12 of salt stream 111E-1 to acid buffer tank 121E-2 and base buffer tank 121E-3. In some embodiments, fluid buffering system 120E includes one or more intermediate buffer tanks that may be utilized to facilitate the distribution of salt stream portion 111E-12 to acid buffer tank 121E-2 and base buffer tank 121E-3. In the specific embodiment depicted in FIG. 8, a first intermediate buffer tank 121E-4 receives salt stream portion 111E-12 from salt buffer tank 121E-1, and distributes a first sub-portion 111E-121 of salt stream portion 111E-12 to a second intermediate buffer tank 121E-5 and a second sub-portion 111E-122 of salt stream portion 111E-12 to a third intermediate buffer tank 121E-6 by way of corresponding intermediate lines, and then the distributed sub-portions are directed from intermediate buffer tanks 121E-5 and 121E-6 to acid buffer tank 121E-2 and base buffer tank 121E-3, respectively, by way of corresponding feed lines. In other embodiments a smaller or larger number of intermediate buffer tanks may be used. In each of these cases, reduced-salt fluid can be directed to all three of salt buffer tank 121E-1, acid buffer tank 121E-2 and base buffer tank 121E-3.

Referring to the lower portion of FIG. 8, in some embodiments flow control system 140E is further configured to facilitate a feed-and-bleed operations similar to those described above with reference to FIG. 7 (e.g., such that a portion of strong base stream 113E-2 leaving base chamber 133A is diverted and mixed with a portion of depleted salt stream 111E-2 leaving salt chamber 131E to provide base substance 113E-OUT). In this embodiment, flow control system 140E includes a three-way valve 146E that splits strong acid stream 112E-2 leaving acid chamber 132E into a first portion 112E-21 that is returned to acid buffer tank 121E-2 and a second portion 112E-22 that is fed to chemical acid concentrator unit 160E, for example, by way of a fourth intermediate buffer tank 121E-7.

FIG. 9 depicts a modified BPED system 110F according to another embodiment in which a chemical acid concentrator (pretreatment) unit 160F receives brine 66F from a brine feed tank (salt feedstock source) 60F and a strong acid stream portion 112F-22 from an acid concentration feed tank 121F-7 and generates saltwater (reduced-salt fluid) 111F-0 and a concentrated acid solution 112F-OUT in a manner similar to that described above with reference to FIG. 8. In addition, reduced-salt fluid 111F-0 can be supplied from concentrator unit 160F to salt (first) buffer tank 121F-1, a stream portion 111F-11 leaving salt buffer tank 121F-1 is directed to salt chamber 131A of electrodialysis apparatus 130A, and a stream portion 111F-12 leaving salt buffer tank 121F-1 is supplied to base (third) buffer tank 121F-3 by way of optional intermediate buffer tank 121F-6. In the same manner as that associated with the embodiment shown in FIG. 8, electrodialysis apparatus 130A may function to generate a depleted salt stream 111F-2 and a concentrated base stream 113F-2 that are directed along associated output and return lines to generate base substance 113F-OUT, and to generate a strong acid stream 112F-2 that is split to two streams 112F-21 and 112F-22 respectively directed to acid buffer tank 121F-1 and acid concentration feed tank 121F-7.

BPED system 110F differs from BPED 110E (FIG. 8) in that deionized water 77F generated by a deionized water source 70F is supplied to acid buffer tank 121F-2. Deionized water source 70F can be integrated (i.e., part of BPED system 110F), or it may be implemented as an external unit. Deionized water 77F may be supplied by way of one or more intermediate buffer tanks (e.g., by way of buffer tanks 121F-4 and 121F-5, as depicted in FIG. 9), or may be supplied directly from deionized water source 70F to acid buffer tank 121F-2. Note that deionized water 77F is not supplied to base buffer tank 121F-3. That is, deionized water 77F can be utilized solely to replenish the bled-off (diverted) volume associated with strong acid stream portion 112F-22, which is used to generate concentrated acid substance 112F-OUT. The use of deionized water 77F may produce strong acid stream 112F-2 with a substantially lower salt content than corresponding stream 112E-2 described above with reference to FIG. 8, thereby facilitating the generation of clean (substantially salt-free) concentrated acid solution 112F-OUT. Although the generation and use of deionized water 77F may arguably makes BPED system 110F somewhat more expensive to operate (i.e., in comparison to BPED system 110E), this arrangement may be preferred in applications where the purity of concentrated acid solution 112F-OUT is valued higher than the cost of generating deionized water 77F.

Figure 10:
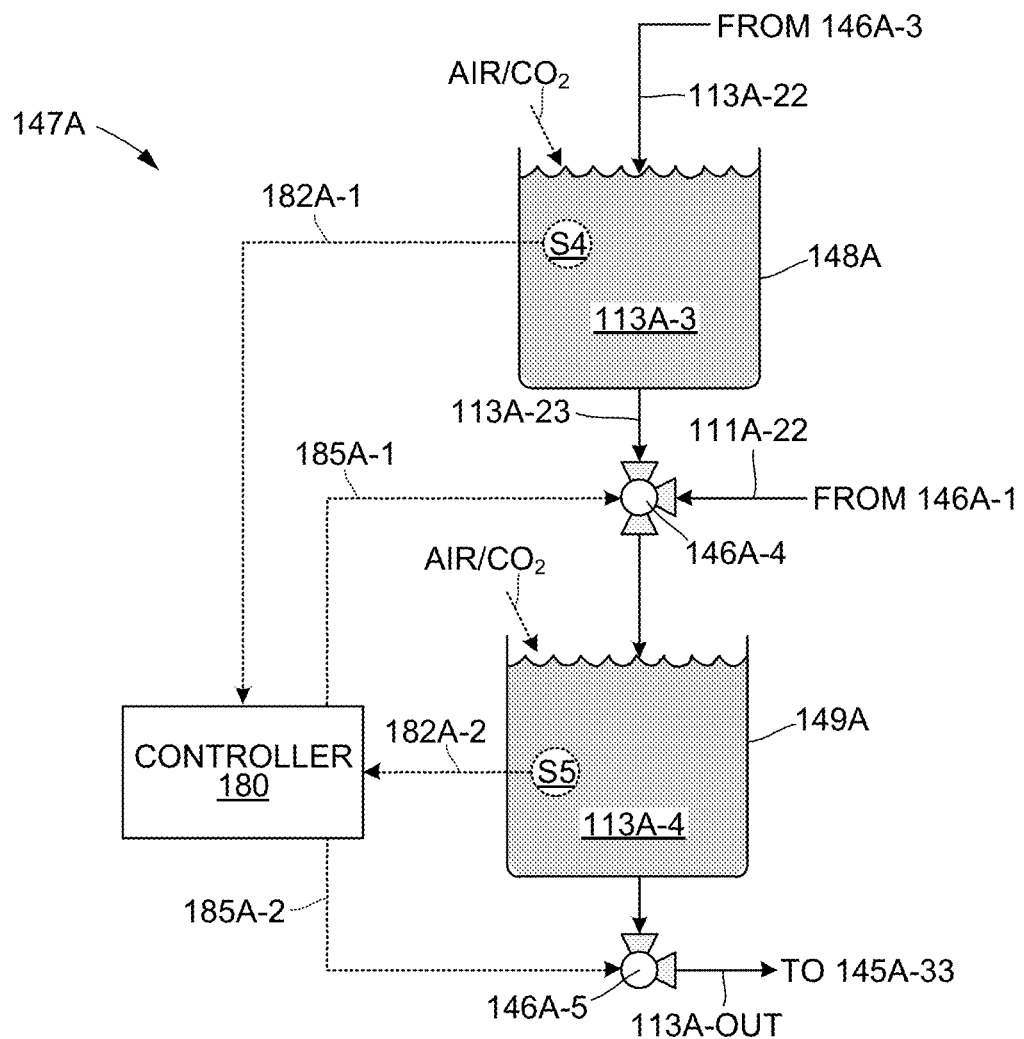
FIG. 10 is a simplified diagram depicting an alkalinity product generation unit according to another embodiment.

FIG. 10 depicts alkalinity product generation unit 147A (FIG. 3) that functions to generate ocean alkalinity product 113A-OUT according to a simplified embodiment. As mentioned above, to avoid endangering sea life, and to maximize the potential benefits to sea life, ocean alkalinity product 113A-OUT can be a well characterized solution including a mixture of the base substance and saltwater that is released (supplied to the ocean) only after verifying that the base substance is fully dissolved in the solution, and that the mixture has an appropriate pH value. To this end, alkalinity product generation unit 147A can function to both verify and, if necessary, perform post-processing of the base solution generated by base generating device 110A (FIG. 3) before releasing the verified/processed base solution as ocean alkalinity product 113A-OUT. In the embodiment shown in FIG. 10, alkalinity product generation unit 147A may utilize two buffer tanks 148A and 149A to verify/ process base solution. Note that the verification and optional processing described below is not limited to the depicted two-buffer-tank arrangement and may be achieved using a single buffer tank or more than two buffer tanks. That is, the embodiment is intended to illustrate various options and not intended to be limiting.

Referring to the upper portion of FIG. 10, buffer tank 148A can be configured to store base solution 113A-3 that is supplied in sub-stream 113A-22 by way of valve 146A-3 (see FIG. 3). At least one sensor S4 can be operably disposed in buffer tank 148A and may be configured to measure pH and optional additional characteristics of base solution 113A-3. In one embodiment, the additional characteristics may include data verifying that the base substance is fully dissolved in base solution 113A-3. Base solution data 182A-1 generated by sensor S4 can be transmitted to controller 180 (FIG. 1). In some embodiments, when base solution data 182A-1 indicates base solution 113A-3 has an undesirable pH or other undesirable characteristic, controller 180 may initiate processing of base solution 113A-3 to correct the undesirable characteristic. For example, controller 180 may adjust the pH of base solution 113A-3 by retaining base solution 113A-3 in buffer tank 148A for an extended period to facilitate a reaction with air or $CO_2$ (i.e., partially equilibrate/pull down $CO_2$ into the base solution while in buffer tank 148A). In other cases, controller 180 may generate one or more control signals (not indicated) to initiate one or more processes (e.g., low-energy stirring and/or venting processes, or diluting with fresh seawater or depleted brine) to correct corresponding undesirable characteristics.

Buffer tank 149A can be configured to receive and store a base/salt solution 113A-4, which comprises a mixture of base solution stream 113A-23 from buffer tank 148A and a dilution stream from another source. This arrangement can be utilized, for example, when the pH of base solution 113A-3 is too high for release into the ocean, and involves utilizing the dilution stream to adjust the pH of base solution 113A-3 and/or by reacting base solution 113A-4 with air or $CO_2$ to achieve an acceptable pH value. In the depicted embodiment, the dilution stream comprises processed feedstock (depleted salt) solution provided in salt sub-stream 111A-22 received from valve 146A-1 (see FIG. 3). In other embodiments (not shown), the saltwater stream may comprise seawater or brine. In yet other cases, where base solution 113A-3 already includes a sufficient amount of salt, the dilution stream may comprise fresh or deionized water. In any case, when base solution data 182A-1 indicates that the pH and optional other characteristics of base solution 113A-3 are within acceptable ranges, controller 180 may activate control signal 185A-1 that controls valve 146A-4, whereby base solution 113A-3 can be mixed with an appropriate quantity of diluting liquid. At least one sensor S5 may be operably disposed in buffer tank 149A and is configured to measure pH and optional additional characteristics of base/salt solution 113A-4. Alkaline product data 182A-2 generated by sensor S5 can be transmitted to controller 180 (FIG. 1), and controller 180 may adjust the flow rate of dilution fluid through valve 146A-4 to fine tune the pH value of base/salt solution 113A-4 in buffer tank 149A. Only when alkaline product data 182A-2 verifies the acceptability of the pH value (and optional other characteristics) of base/salt solution 113A-4, controller 180 may control the flow of base/salt solution 113A-4 from buffer tank 149A (e.g., by way of controlling an outflow valve 146A-5 by way of control signal 185A-2), thereby supplying ocean alkalinity product 113A-OUT to the ocean (e.g., by way of pump 145A-33, shown in FIG. 3).

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. An electrochemical ocean alkalinity enhancement (OAE) system configured to capture atmospheric carbon dioxide and mitigate ocean acidification, the OAE system comprising:
    a base-generating device that is configured to generate an ocean alkalinity product byprocessing a feedstock solution and configured to supply the ocean alkalinity product to an ocean at a designated outfall location, wherein the ocean alkalinity product includes a salt solution comprising a fully dissolved base substance; and
    a control circuit configured to monitor input data received from multiple sources and to control operations performed by the base-generating device in response to the received input data such that the ocean alkalinity product is generated and supplied to the ocean only when said input data received by the control circuit indicates (1) sufficient low/zero-carbon electricity is available to operably power the base-generating device, (2) the base-generating device is operably configured to safely generate and supply the ocean alkalinity product, and (3) supplying the ocean alkalinity product will not endanger sea life in the ocean.

2. The OAE system of claim 1, wherein the base-generating device comprises a bipolar electrodialysis (BPED) system comprising:
    a buffering system comprising a first buffer tank configured to store the feedstock solution, a second buffer tank configured to store an acid solution, and a third buffer tank configured to store a base solution;
    an electrodialysis apparatus comprising at least one salt chamber, at least one acid chamber and at least one base chamber; and
    a flow control system configured to: (i) direct a first stream comprising a portion of the feedstock solution from the first buffer tank through the at least one salt chamber, (ii) direct a second stream comprising at least a portion of the acid solution from the second buffer tank through the at least one acid chamber, and (iii) direct a third stream comprising a portion of the base solution from the third buffer tank through the at least one base chamber,
    wherein the electrodialysis apparatus is configured to generate both a strong base stream including the fully dissolved base substance and a strong acid stream containing an acid substance by electrochemically processing the first stream, the second stream and the third stream.

3. The OAE system of claim 2,
    wherein the electrodialysis apparatus comprises:
    a plurality of salt chambers, a plurality of acid chambers and a plurality of base chambers arranged in series such that each said salt chamber is disposed between an adjacent said acid chamber and an adjacent said base chamber, and each said base chamber is disposed between an adjacent said salt chamber and an adjacent said acid chamber;

a plurality of first membranes, each of the first membranes being disposed between an associated said salt chamber and its associated adjacent acid chamber and being configured to pass chlorine ions from said associated salt chamber to said adjacent acid chamber;

a plurality of second membranes, each of the second membranes being disposed between an associated said salt chamber and its associated adjacent base chamber and being configured to pass sodium ions from said associated salt chamber to said adjacent base chamber; and a plurality of third membranes, each of the third membranes being disposed between an associated said acid chamber and its associated adjacent base chamber and being configured to: (i) pass hydrogen ions from said associated base chamber to said adjacent acid chamber, and (ii) to pass hydroxide ions from the adjacent acid chamber to the adjacent base chamber.

4. The OAE system of claim 2, wherein the BPED system further comprises an electrolyzer configured to generate hydrogen gas by processing the acid substance.

5. The OAE system of claim 4, wherein the BPED system further comprises a fuel cell configured to generate supplemental low/zero-carbon electricity by processing the hydrogen gas.

6. The OAE system of claim 2, wherein the control circuit is further configured to control the flow control system such that:

during a first time period a portion of the feedstock solution flows from the first buffer tank through the at least one salt chamber and a portion of the base solution flows from the third buffer tank through the at least one base chamber, and during a second time period, at least a portion of the acid solution flows from the second buffer tank through at least one of the salt chamber and the base chamber.

7. The OAE system of claim 2, wherein the flow control system comprises:

a first three-way valve connected to a salt inflow line between the first buffer tank and the at least one salt chamber and operably coupled to an acid inflow line by a first cross-feed line, wherein the acid inflow line is configured to transmit the second stream from the second buffer tank to the at least one acid chamber, a second three-way valve connected to a base inflow line between the third buffer tank and the at least one base chamber and operably coupled to the acid inflow line by a second cross-feed line, and wherein the control circuit is further configured to control the first three-way valve and the second three-way valve such that:

during a first time period a portion of the feedstock solution flows from the first buffer tank through the first three-way valve to the at least one salt chamber and a portion of the base solution flows from the third buffer tank through the second three-way valve to the at least one base chamber, and during a second time period, at least a portion of the acid solution flows from the second buffer tank through the first and second three-way valves to at least one of the salt chamber and the base chamber.

8. The OAE system of claim 2, wherein the BPED system further comprises a pretreatment unit configured to generate a reduced-salt fluid by processing the feedstock solution, and wherein the flow control system is further configured to direct the reduced-salt fluid to at least one of the second buffer tank and the third buffer tank.

9. The OAE system of claim 8, wherein the feedstock solution comprises seawater, wherein the pretreatment unit comprises a reverse osmosis unit configured to process the seawater and to generate both the reduced-salt fluid and a high-salt fluid, the high-salt fluid having a higher salt concentration than both the seawater and the reduced-salt fluid, and wherein the flow control system is further configured to direct the high-salt fluid to the first buffer tank and to direct the reduced-salt fluid to both the second buffer tank and the third buffer tank.

10. The OAE system of claim 8, wherein the feedstock solution comprises brine, wherein the pretreatment unit comprises a chemical acid concentrator configured to process the brine and at least a portion of the acid substance to generate a concentrated acid substance and the reduced-salt fluid, wherein the reduced-salt fluid has a lower salt concentration than the brine, and wherein the flow control system is further configured to direct the reduced-salt fluid to the first buffer tank.

11. The OAE system of claim 10, wherein the flow control system is further configured to direct portions of the reduced-salt fluid to both the second buffer tank and the third buffer tank.

12. The OAE system of claim 10, wherein the BPED system further comprises a water deionization unit configured to generate deionized water, and wherein the flow control system is further configured to direct the deionized water to the second buffer tank and to direct a portion of the reduced-salt fluid to the third buffer tank.

13. An electrochemical ocean alkalinity enhancement (OAE) system comprising:

a BPED system comprising:

a buffering system comprising an acid buffer tank configured to store an acid solution, an electrodialysis apparatus comprising at least one salt chamber, at least one acid chamber, at least one base chamber, and a flow control system comprising a plurality of flow lines connected between the buffering system and the electrodialysis apparatus; and a control circuit configured to control the SPED to perform base generating operations during first time periods and descaling maintenance operations during second time periods, wherein:

during each said base generating operation, the control circuit controls the flow control system to direct a salt stream through the at least one salt chamber, to direct an acid stream comprising at least a portion of the acid solution from the acid buffer tank through the at least one acid chamber, and to direct a base stream through the at least one base chamber, and the control circuit controls the electrodialysis apparatus to electrochemically process the salt stream passing through the at least one salt chamber in a way that increases an amount of acid in the acid stream and an amount of base substance in the base stream; and during each said descaling maintenance operation, the control circuit controls the flow control system to direct the acid stream from the acid buffer tank through the at least one salt chamber and the at least one base chamber.

14. The OAE system of claim 13,
wherein the electrodialysis apparatus further comprises a first ion-permeable membrane disposed between the at least one salt chamber and the at least one acid chamber, and a second ion-permeable membrane disposed between the at least one salt chamber and the at least one base chamber;
wherein electrochemically processing the salt stream during said each base generating operation produces scaling material on the first ion-permeable membrane and the second ion-permeable membrane; and
wherein the control circuit is further configured to direct the acid stream through the at least one salt chamber and the at least one base chamber during said each descaling maintenance operation until the scaling material is removed from the first ion-permeable membrane and second ion-permeable membrane.

15. The OAE system of claim 13,
wherein the buffering system further comprises a salt buffer tank configured to store a feedstock solution and a base buffer tank configured to store a base solution;
wherein the plurality of flow lines comprises a salt inflow line extending from an outflow port of the salt buffer tank to the electrodialysis apparatus, an acid inflow line extending from an outflow port of the acid buffer tank to the electrodialysis apparatus, and a base inflow line extending from an outflow port of the base buffer tank to the electrodialysis apparatus; and
wherein, during said each base generating operation, the control circuit controls the flow control system such that the salt stream comprises a portion of the feedstock solution that is directed by the salt inflow line through the at least one salt chamber, the acid stream comprises a portion of the acid solution that is directed by the acid inflow line through the at least one acid chamber, and the base stream comprises a portion of the base solution that is directed by the base inflow line through the at least one base chamber.

16. The OAE system of claim 15,
wherein the plurality of flow lines further comprises a first cross-feed line disposed between the acid inflow line and the salt inflow line and a second cross-feed line disposed between the acid inflow line and the base inflow line;
wherein the flow control system further comprises a plurality of valves; and
wherein the control circuit is configured to control the plurality of valves such that, during said each descaling maintenance operation, a first portion of the acid stream is directed along the first cross-feed line and through the at least one salt chamber, and a second portion of the acid stream is directed along the second cross-feed line and through the at least one base chamber.

17. The OAE system of claim 16,
wherein the plurality of valves comprises:
a first three-way valve connected to the salt inflow line between the salt buffer tank and the at least one salt chamber and operably coupled to the acid inflow line by the first cross-feed line, and
a second three-way valve connected to the base inflow line between the base buffer tank and the at least one base chamber and operably coupled to the acid inflow line by the second cross-feed line; and wherein the control circuit is further configured to control the first three-way valve and the second three-way valve such that:
during said each base-generating operation, the feedstock solution flows from the salt buffer tank through the first three-way valve to the at least one salt chamber and the base solution flows from the base buffer tank through the second three-way valve to the at least one base chamber, and
during said each descaling maintenance operation, at least a portion of the acid solution flows from the acid buffer tank through the first and second three-way valves to both the at least one salt chamber and the base chamber.

18. The OAE system of claim 16,
wherein the plurality of flow lines further comprises:
at least one salt outflow line extending from the electrodialysis apparatus to an inflow port of the salt buffer tank,
at least one acid outflow line extending from the electrodialysis apparatus to an inflow port of the acid buffer tank,
at least one base outflow line extending from the electrodialysis apparatus to an inflow port of the base buffer tank,
a third cross-feed line disposed between the at least one salt outflow line and the at least one acid outflow line,
a fourth cross-feed line disposed between the at least one base outflow line and the at least one acid outflow line; and
wherein the control circuit is further configured to control the plurality of valves such that, during said each descaling maintenance operation, said first portion of the acid stream exiting the at least one salt chamber is directed along the third cross-feed line to the at least one acid outflow line, and the second portion of the acid stream exiting the at least one base chamber is directed along the fourth cross-feed line to the at least one acid outflow line.

19. An electrochemical ocean alkalinity enhancement (OAE) system comprising:
a BPED system comprising:
a buffering system comprising a salt buffer tank configured to store a feedstock solution, an acid buffer tank configured to store an acid solution, and a base buffer tank configured to store a base solution,
an electrodialysis apparatus comprising at least one salt chamber, at least one acid chamber, at least one base chamber, at least one first ion-permeable membrane disposed between the salt chamber and the acid chamber, a second ion-permeable membrane disposed between the salt chamber and the base chamber, and
a flow control system comprising a plurality of flow lines connected between the buffering system and the electrodialysis apparatus; and
a control circuit configured to control the BPED to perform base generating operations during first time periods and descaling maintenance operations during second time periods, wherein:
during each said base generating operation, the control circuit controls the flow control system to direct a salt stream comprising a portion of the feedstock solution from the salt buffer tank through the at least one salt chamber, to direct an acid stream comprising at least a portion of the acid solution from the acid buffer tank through the at least one acid chamber, and to direct a base stream comprising a portion of the base solution from the base buffer tank through the at least one base chamber, and the control circuit controls the electrodialysis apparatus to electrochemically process the salt stream passing through the at least one salt chamber in a way that increases an amount of acid in the acid stream and the amount of base substance in the base stream, whereby scaling material is produced on the first ion-permeable membrane and the second ion-permeable membrane; and during each said descaling maintenance operation, the control circuit controls the flow control system to direct the acid stream from the acid buffer tank through the at least one salt chamber and the at least one base chamber until the scaling material is removed from the first ion-permeable membrane and second ion-permeable membrane.

20. An electrochemical ocean alkalinity enhancement (OAE) system configured to capture atmospheric carbon dioxide and mitigate ocean acidification, the OAE system including a bipolar electrodialysis (BPED) system that is controlled by a control circuit to perform base-generating operations during first time periods and maintenance operations during second time periods, the BPED system being configured to generate an ocean alkalinity product including a salt solution and a dissolved base substance by electrochemically processing a feedstock solution when performing the base-generating operations, wherein the BPED system comprises:

a buffering system comprising a first buffer tank configured to store the feedstock solution, a second buffer tank configured to store an acid solution, and a third buffer tank configured to store a base solution;

an electrodialysis apparatus comprising at least one salt chamber, at least one acid chamber and at least one base chamber; and a flow control system configured to: (i) direct a first stream comprising a portion of the feedstock solution from the first buffer tank through the at least one salt chamber, (ii) direct a second stream comprising at least a portion of the acid solution from the second buffer tank through the at least one acid chamber, and (iii) direct a third stream comprising a portion of the base solution from the third buffer tank through the at least one base chamber, wherein the electrodialysis apparatus is configured to generate both an acid substance and at least a portion of the ocean alkalinity product by electrochemically processing the first stream, the second stream and the third stream, and wherein the flow control system comprises:

a first three-way valve connected to a salt inflow line between the first buffer tank and the at least one salt chamber and operably coupled to an acid inflow line by a first cross-feed line, wherein the acid inflow line is configured to transmit the second stream from the second buffer tank to the at least one acid chamber, and a second three-way valve connected to a base inflow line between the third buffer tank and the at least one base chamber and operably coupled to the acid inflow line by a second cross-feed line, and wherein the control circuit is further configured to control the first three-way valve and the second three-way valve such that:

during each said first time period the feedstock solution flows from the first buffer tank through the first three-way valve to the at least one salt chamber and the base solution flows from the third buffer tank through the second three-way valve to the at least one base chamber, and during each said second time period, at least a portion of the acid solution flows from the second buffer tank through the first and second three-way valves to both the at least one salt chamber and the base chamber.

* * * * *